US009262437B2

(12) United States Patent
Nakagawa et al.

(10) Patent No.: US 9,262,437 B2
(45) Date of Patent: Feb. 16, 2016

(54) STORAGE SYSTEM AND CONTROL METHOD FOR STORAGE SYSTEM

(71) Applicant: Hitachi, Ltd., Tokyo (JP)

(72) Inventors: Hirotaka Nakagawa, Sagamihara (JP); Hideo Saito, Kawasaki (JP); Nobuhito Mori, Kawasaki (JP); Tomohiro Kawaguchi, Chigasaki (JP); Abhishek Johri, Yokohama (JP); Naoko Ikegaya, Sagamihara (JP); Yoichi Goto, Yokohama (JP); Kunihiko Nashimoto, Ninomiya (JP); Akira Yamamoto, Sagamihara (JP)

(73) Assignee: HITACHI, LTD., Tokyo (JP)

( * ) Notice: Subject to any disclaimer, the term of this patent is extended or adjusted under 35 U.S.C. 154(b) by 101 days.

(21) Appl. No.: 13/814,270

(22) PCT Filed: Jan. 7, 2013

(86) PCT No.: PCT/JP2013/000005
§ 371 (c)(1),
(2) Date: Feb. 5, 2013

(87) PCT Pub. No.: WO2014/106872
PCT Pub. Date: Jul. 10, 2014

(65) Prior Publication Data
US 2014/0195573 A1    Jul. 10, 2014

(51) Int. Cl.
*G06F 17/30* (2006.01)
*G06F 3/06* (2006.01)
(52) U.S. Cl.
CPC ........ *G06F 17/30194* (2013.01); *G06F 3/0605* (2013.01); *G06F 3/067* (2013.01); *G06F 3/0659* (2013.01); *G06F 3/0665* (2013.01)

(58) Field of Classification Search
CPC .................... G06F 17/30067; G06F 3/0605
USPC ....................................................... 707/827
See application file for complete search history.

(56) References Cited

U.S. PATENT DOCUMENTS

| 8,161,487 B2* | 4/2012 | Shiga et al. .................... 718/104 |
| 2006/0224854 A1 | 10/2006 | Nakamura |
| 2006/0248297 A1 | 11/2006 | Watanabe et al. |
| 2006/0253683 A1* | 11/2006 | Zohar et al. .................... 711/173 |

(Continued)

FOREIGN PATENT DOCUMENTS

| EP | 1 720 101 A1 | 11/2006 |
| WO | 2010/092576 A1 | 8/2010 |

*Primary Examiner* — Rehana Perveen
*Assistant Examiner* — Hicham Skhoun
(74) *Attorney, Agent, or Firm* — Volpe and Koenig, P.C.

(57) ABSTRACT

An example of the present invention is a storage system comprising a first real storage apparatus including a plurality of real resources. The first real storage apparatus includes: real resource groups allocated to a plurality of virtual storage apparatuses; first management information for associating virtual resource identifiers individually assigned to real resources in a namespace independently defined for each of the plurality of virtual storage apparatuses with real resource identifiers individually assigned to the real resources in a namespace defined for the first real storage apparatus; and a controller for receiving a command including a designation with a virtual resource identifier, converting the virtual resource identifier in the command into a real resource identifier with reference to the first management information, and processing the command with the converted real resource identifier.

12 Claims, 24 Drawing Sheets

(56) References Cited

U.S. PATENT DOCUMENTS

| | | |
|---|---|---|
| 2007/0233997 A1 | 10/2007 | Kobara |
| 2008/0034005 A1* | 2/2008 | Satoyama et al. ............ 707/200 |
| 2010/0064292 A1* | 3/2010 | Akutsu et al. ................ 718/104 |
| 2012/0066450 A1 | 3/2012 | Yochai et al. |
| 2012/0066469 A1 | 3/2012 | Yochai et al. |
| 2012/0072694 A1 | 3/2012 | Yochai et al. |
| 2012/0072695 A1* | 3/2012 | Kottomtharayil et al. .... 711/172 |
| 2012/0233437 A1* | 9/2012 | Usami .......................... 711/171 |
| 2013/0254500 A1* | 9/2013 | Nakajima et al. ............ 711/162 |
| 2013/0268644 A1* | 10/2013 | Hardin et al. ................ 709/223 |

* cited by examiner

| USER ACCOUNT MANAGEMENT TABLE 2327 ||||
|---|---|---|---|
| USER ID 2327A | RPU ID 2327B | PERMISSION LEVEL 2327C | PASSWORD 2327D |
| ADMIN1 | 01 | STORAGE ADMIN | ****** |
| ADMIN2 | 02 | STORAGE ADMIN | ****** |
| ADMIN3 | FF (ALL_RPU) | STORAGE ADMIN | ****** |
| | | MODIFY VIRTUAL STORAGE | |

RPU MANAGEMENT TABLE 2325

| RPU ID 2325A | VENDOR 2325B | MODEL 2325C | S/N 2325D | MANAGEMENT PORT IP ADDRESS 2325E | NUMBER OF VOLUMES 2325F | NUMBER OF PORTS 2325G | NUMBER OF PARITY GROUPS 2325H | STATUS 2325I |
|---|---|---|---|---|---|---|---|---|
| 00 | DEFAULT | DEFAULT | DEFAULT | 20.174.32.1 | 32768(65536) | 32(255) | 32768(65536) | ACTIVE |
| 01 | VENDOR1 | MODEL1 | 1111 | 111.11.11.1 | 8192(65536) | 128(255) | 16384(65536) | ACTIVE |
| 02 | VENDOR1 | MODEL2 | 1212 | 10.20.30.40 | 16384(65536) | 64(255) | 8192(65536) | ACTIVE |
| 03 | 0 | 0 | 0 | 0 | 0 | 0 | 0 | INACTIVE |
| ... | ... | ... | ... | ... | ... | ... | ... | ... |
| 3F | VENDOR2 | MODEL4 | 6363 | 63.63.63.63 | 8192(32768) | 95(255) | 8192(65536) | ACTIVE |

2326

RESOURCE ID MANAGEMENT TABLE

| REAL RESOURCE ID | TYPE | RPU ID | VIRTUAL RESOURCE ID |
|---|---|---|---|
| PORT#00 | PORT | 00 | NULL |
| PORT#01 | PORT | 01 | PORT#00 |
| PORT#02 | PORT | 02 | PORT#00 |
| ... | PORT | ... | ... |
| PORT#FF | PORT | 3F | PORT#FF |
| VOL#0000 | VOLUME | 00 | NULL |
| VOL#0001 | VOLUME | 01 | VOL#0000 |
| VOL#0002 | VOLUME | 02 | VOL#0E01 |
| ... | VOLUME | ... | ... |
| VOL#FFFF | VOLUME | 3F | VOL#FFFF |
| PG#0000 | PARITY GROUP | 00 | NULL |
| PG#0001 | PARITY GROUP | 01 | PG#0000 |
| PG#0010 | PARITY GROUP | 02 | PG#0000 |
| ... | PARITY GROUP | ... | ... |
| PG#FFFF | PARITY GROUP | 3F | PG#FFFF |

Fig. 7

| STORAGE APPARATUS MODEL LIST 2328 | |
|---|---|
| VENDOR 2328A | MODEL 2328B |
| VENDOR1 | MODEL1 |
| VENDOR1 | MODEL2 |
| VENDOR2 | MODEL1 |
| VENDOR2 | MODEL3 |

Fig. 8

VIRTUAL STORAGE APPARATUS MANAGEMENT VIEW

■ VIRTUAL STORAGE APPARATUS LIST  ~V1010

| STORAGE APPARATUS ID | RPU ID |
|---|---|
| VENDOR1.MODEL1.1111 | 01 |
| VENDOR1.MODEL2.1212 | 02 |
| VENDOR2.MODEL4.6363 | 3F |
|  |  |
|  |  |

◆ NUMBER OF VIRTUAL STORAGE APPARATUSES : 3/64  ~V1020

■ CONFIGURATION OF VIRTUAL STORAGE APPARATUS

VENDOR ID : VENDOR1 ▼ (VENDOR1, VENDOR2)  ~V1030

MODEL : MODEL1 ▼ (MODEL1, MODEL2)  ~V1040

SERIAL NUMBER : 5555  ~V1050

MANAGEMENT PORT IP ADDRESS : 192.168.3.12  ~V1060

NUMBER OF PORTS : 32/256  ~V1070

NUMBER OF VOLUMES : 16384/65536  ~V1080

NUMBER OF PARITY GROUPS : 8192/32768  ~V1090

[PROCEE] ~V1100    [CANCEL] ~V1110    [BACK] ~V1120

Fig. 12

| USER ACCOUNT MANAGEMENT TABLE T1000 ||
|---|---|
| USER ID (T1010) | ALLOCATED RPU (T1020) |
| VDKC1 ADMIN | ST1.RPU#01 |
|  | ST2.RPU#01 |
|  | ST3.RPU#01 |
| VDKC2 ADMIN | ST1.RPU#02 |
|  | ST2.RPU#02 |
|  | ST3.RPU#02 |
| ST1 ADMIN | ST1.RPU#00 |
| ST2 ADMIN | ST2.RPU#00 |
| ST3 ADMIN | ST3.RPU#00 |
| DKC POOL ADMIN | ALL RPU |

Fig. 17

DKC POOL MANAGEMENT TABLE 2329

| REAL STORAGE APPARATUS ID (I1000) | SYSTEM DEVICE ID (I1010) | ACCESS PORT WWN (I1020) | MAIN SYSTEM DEVICE (I1030) |
|---|---|---|---|
| ST1 | ST1.VOL1 | 10:10:10:10:10:10 | 1 |
|  |  | 11:22:33:54:78:66 |  |
| ST2 | ST2.VOL1 | 45:67:87:4c:14:a2 | 0 |
|  |  | 33:a4:2b:69:11:84 |  |
| ST3 | ST3.VOL3 | 24:a1:c8:bb:87:11 | 0 |
|  |  | 64:bc:c2:56:54:32 |  |

Fig. 18

META INFORMATION TABLE 2330

| RPU ID | VIRTUAL RESOURCE ID | REAL STORAGE APPARATUS ID |
|---|---|---|
| 00 | VOL#0000 | ST1 |
| 00 | VOL#0001 | ST2 |
| 00 | VOL#0002 | NA |
| ... | ... | ... |
| 00 | VOL#FFFF | ST3 |
| 00 | PORT#00 | ST1 |
| 00 | PORT#01 | ST2 |
| 00 | PORT#02 | NA |
| 00 | ... | ... |
| 00 | PORT#FF | ST3 |
| 00 | PG#0000 | ST1 |
| 00 | PG#0001 | ST2 |
| 00 | PG#0002 | NA |
| ... | ... | ... |
| 00 | PG#FFFF | ST3 |
| 01 | VOL#0000 | ST2 |
| 01 | VOL#0001 | ST3 |
| ... | ... | ... |
| 01 | PORT#02 | ST2 |
| ... | ... | ... |
| 01 | PG#0001 | ST1 |
| ... | ... | ... |

Fig. 19

STORAGE SYSTEM AND CONTROL METHOD FOR STORAGE SYSTEM

TECHNICAL FIELD

This invention relates to a storage system and a control method for the storage system.

BACKGROUND ART

In a computer system including a plurality of real storage apparatuses interconnected via a network, a method of managing volume identifiers is employed to provide a host computer and a management computer with a plurality of logical volumes in the real storage apparatuses as a single logical volume of a virtual storage apparatus (for example, refer to PTL 1).

This method of managing volume identifiers enables transfer of a logical volume in a virtual storage apparatus from a real storage apparatus to another in the same network without stopping tasks using volumes or volume management in a host computer.

In a recent large-scale aggregate storage environment where a plurality of companies or a plurality of departments share and use real storage apparatuses, desired for storage management to reduce the burdens on storage administrators is an approach to multitenancy management, which provides each company or each department with a storage administrator and distributes real storage resources to the administrator. In such an environment, a resource configuration management method that logically divides the real storage resources into a plurality of clusters is typically employed (for example, refer to PTL 2).

CITATION LIST

Patent Literature

PTL 1: US 2008/0034005 A1
PTL 2: US 2006/0224854 A1

SUMMARY OF INVENTION

Technical Problem

In the case where the method according to PTL 1 is applied to a computer system employing the multitenancy management, a plurality of administrators assigned on a company basis, a department basis, or a task basis share one virtual storage apparatus. Accordingly, if some administrator manipulates a wrong volume, any other administrator might experience data loss or a delay in work.

The resources in the virtual storage apparatus can be manually allocated to the administrators; however, this method is more likely to cause inappropriate allocation of the resources with increase in resources or administrators. Furthermore, the administrators bear increasing burdens of distributing the resources and the system requires more expense for the distribution.

In the meanwhile, in the case where the method according to PTL 2 is applied, the resources of one real storage apparatus are divided into a plurality of groups. An administrator who uses some logical division cannot use an identifier for a resource that has been allocated to any other logical division; accordingly, he/she is required to manage resources in consideration of the other logical divisions.

This invention has been accomplished in view of the aforementioned problems in the existing techniques and an object of this invention is to provide a system that divides the real storage resources of one or more real storage apparatuses into a plurality of logical groups and provides a host computer or an administrator with one or more of the logical groups as an individually-manageable single virtual storage apparatus and a control method for such a system.

Solution to Problem

An aspect of this invention is a storage system including a first real storage apparatus including a plurality of real resources. The first real storage apparatus includes: real resource groups allocated to a plurality of virtual storage apparatuses; first management information for associating virtual resource identifiers individually assigned to real resources in a namespace independently defined for each of the plurality of virtual storage apparatuses with real resource identifiers individually assigned to the real resources in a namespace defined for the first real storage apparatus; and a controller for receiving a command including a designation with a virtual resource identifier, converting the virtual resource identifier in the command into a real resource identifier with reference to the first management information, and processing the command with the converted real resource identifier.

Advantageous Effects of Invention

According to an aspect of this invention, real storage resources of one or more real storage apparatuses are divided into a plurality of groups and one or more of the groups are provided to a host computer or an administrator as an individually-manageable single virtual storage apparatus.

BRIEF DESCRIPTION OF DRAWINGS

FIG. 5 is a diagram illustrating an exemplary configuration of a user account management table in Example 1.

FIG. 6 is a diagram illustrating an exemplary configuration of an RPU management table in Example 1.

FIG. 7 is a diagram illustrating an exemplary configuration of a resource ID management table in Example 1.

FIG. 8 is a diagram illustrating an exemplary configuration of a storage apparatus model list in Example 1.

FIG. 12 is a diagram illustrating an exemplary view of a virtual storage apparatus management window in Example 1.

FIG. 17 is a diagram illustrating an exemplary configuration of the user account management table in Example 2.

FIG. 18 is a diagram illustrating an exemplary configuration of a DKC pool management table in Example 2.

FIG. 19 is a diagram illustrating an exemplary configuration of a meta information table in Example 2.

DESCRIPTION OF EMBODIMENTS

Hereinafter, embodiments of this invention are described with reference to the accompanying drawings. The embodiments are merely examples to realize this invention and are not to limit the technical scope of this invention. Throughout the drawings, elements common to some drawings are denoted by the same reference signs unless particularly explained.

The embodiments disclose storage systems including one or more storage apparatuses (real storage apparatuses) to which multitenancy management is applicable and control methods for such systems. The embodiments virtualize the identifiers of volumes and further, virtualize the identifiers of the ports and the parity groups involved in volume accesses from a host computer. In the following description, the elements other than the virtual elements are real elements and the elements without specific reference are real elements. The identifier is also referred to as ID.

The storage systems (real storage systems) in the embodiments include one or more storage apparatuses and the resources (real resources) thereof are divided into a plurality of groups. The storage systems in the embodiments define a plurality of virtual storage apparatuses to provide them to hosts. The storage systems in the embodiments allocate one or more resource groups to each virtual storage apparatus.

For each virtual storage apparatus, an independent namespace is defined. To each resource allocated to a virtual storage apparatus, a virtual resource identifier in the namespace for the particular virtual storage apparatus is assigned. Since a namespace is defined for each virtual storage apparatus, virtual resource identifiers can be assigned and managed individually in each virtual storage apparatus without considering virtual resource identifiers in the other virtual storage apparatuses or real resource identifiers in the real storage apparatuses.

Example 1

This embodiment virtualizes a real storage apparatus (physical storage apparatus) to provide a plurality of virtual storage apparatuses. Each virtual storage apparatus is allocated one resource group (a group of real resources) and the resources in the allocated resource group are assigned virtual resource identifiers.

Figure 1:
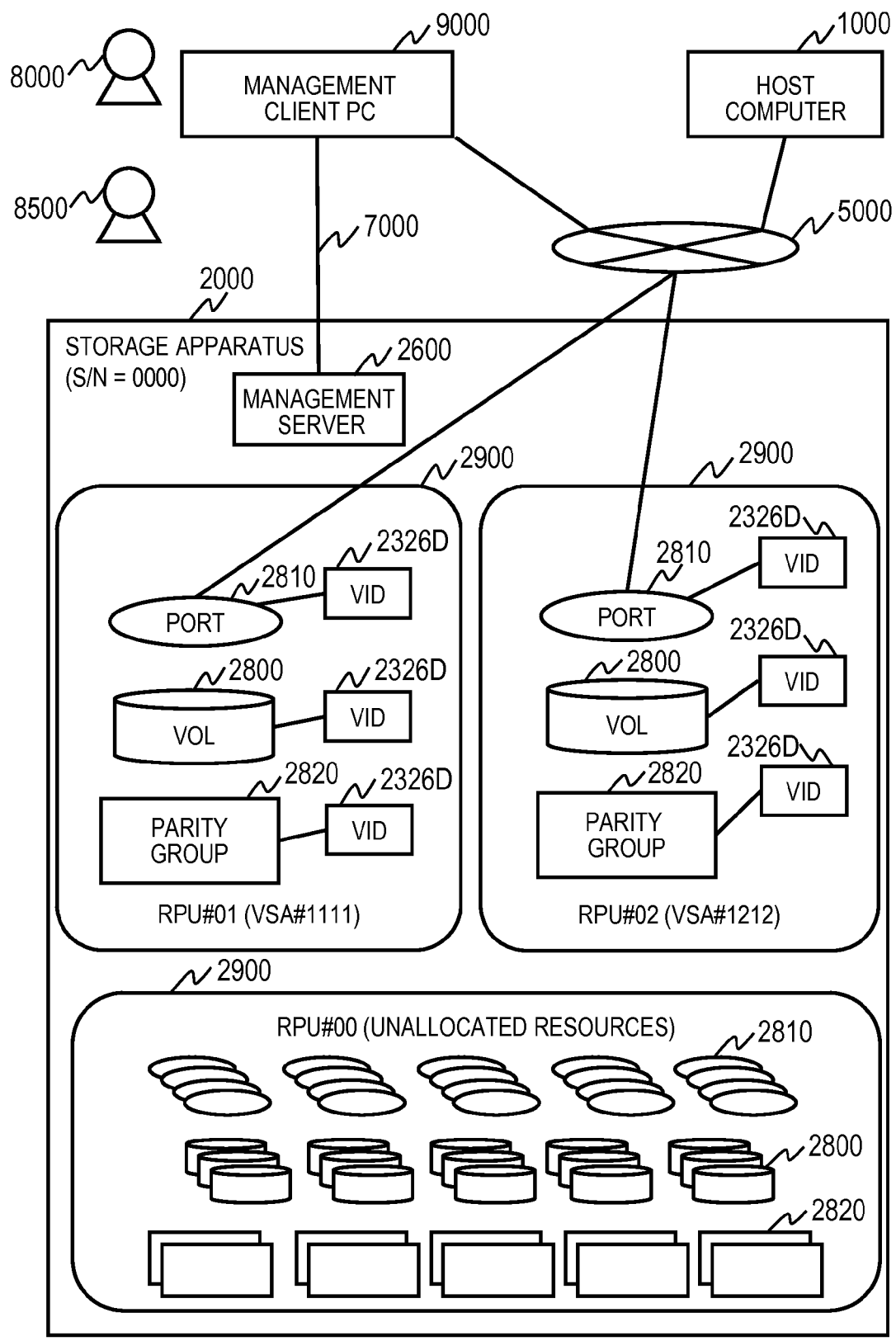
FIG. 1 is a configuration diagram of an overall computer system to illustrate the concept of Example 1.

FIG. 1 is a configuration diagram of an overall computer system, illustrating the concept of Example 1. In FIG. 1, the computer system includes a host computer 1000 and a storage apparatus (real storage apparatus) 2000. The host computer 1000 and the storage apparatus 2000 are connected via a network 5000.

Administrators (users) 8000 and 8500 use a management client PC 9000 to access the storage apparatus 2000. A management server 2600 of the storage apparatus 2000 receives management commands from the management client PC 9000 via a network 7000, converts them to internal control commands, and transfers them to other elements in the storage apparatus 2000. The management server 2600 controls accesses from the management client PC 9000. Details of the processing of the management server 2600 will be described later.

In the example of FIG. 1, the storage apparatus 2000 includes a plurality of resources (real resources), which are divided into three resource groups (referred to as RPUs: Resource Partition Units) 2900. In the example described hereinafter, a single RPU is allocated to a virtual storage apparatus. Each resource has a real resource identifier used in the storage apparatus 2000.

In the example of FIG. 1, the resources (real resources) included in the RPUs 2900 are ports 2810, volumes 2800, and parity groups 2820. The parity group is also referred to as RAID (Redundant Arrays of Independent Disks) group, which is a group of a plurality of drives configured for a RAID.

The volume is also referred to as LDEV (Logical DEVice). Typically, a volume corresponds to a partial storage area of a storage area provided by a parity group. These resources in the storage apparatus 2000 are allocated to any one of the RPUs. Other kinds of resources, such as later-described MPPKs (MicroProcessor PacKages) 2200 and CMPKs (Cache Memory PacKages) 2300, may be included in the RPUs.

The RPU #01 (the RPU having an RPU ID=01) and the RPU #02 (the RPU having an RPU ID=02) are allocated to the VSA #1111 and the VSA #1212 (Virtual Storage Apparatuses having virtual serial numbers 1111 and 1212), respectively. The real resources of each virtual storage apparatus have VIDs (Virtual resource IDentifiers) 2326D to be the resources of a virtual storage apparatus. The RPU #00 (the RPU having an RPU ID=00) is a resource group 2900 that consists of resources unallocated to any virtual storage apparatus; in the example of FIG. 1, none of the resources have a virtual identifier.

In this example, all the resources (the ports, the volumes, and the parity groups) are included in the RPU #00 at the initial state and part of the resources are transferred to other RPU #01 or RPU #02 created afterwards. A volume can be newly created in RPU #01 and the RPU #02.

For each virtual storage apparatus, an individual namespace is defined. Since the namespaces are independent, virtual resource identifiers can be freely assigned to the resources in an RPU 2900 without considering the resource identifiers (virtual resource identifiers and real resource identifiers) used in the other virtual storage apparatuses and the storage apparatus 2000. The virtual resource identifiers are unique to the virtual storage apparatus.

In response to a resource identifier report request from the host computer 1000 or the management client PC 9000, the resource identifier control function of the storage apparatus 2000 returns a virtual resource identifier 2326D.

As a result, the administrators 8000 and 8500 using the host computer 1000 and the management client PC 9000 recognize the resources in the RPU #01 as the resources of the storage apparatus having a serial number of 1111 and recognizes the resources in the RPU #02 as the resources of the storage apparatus having a serial number of 1212.

Figure 2:
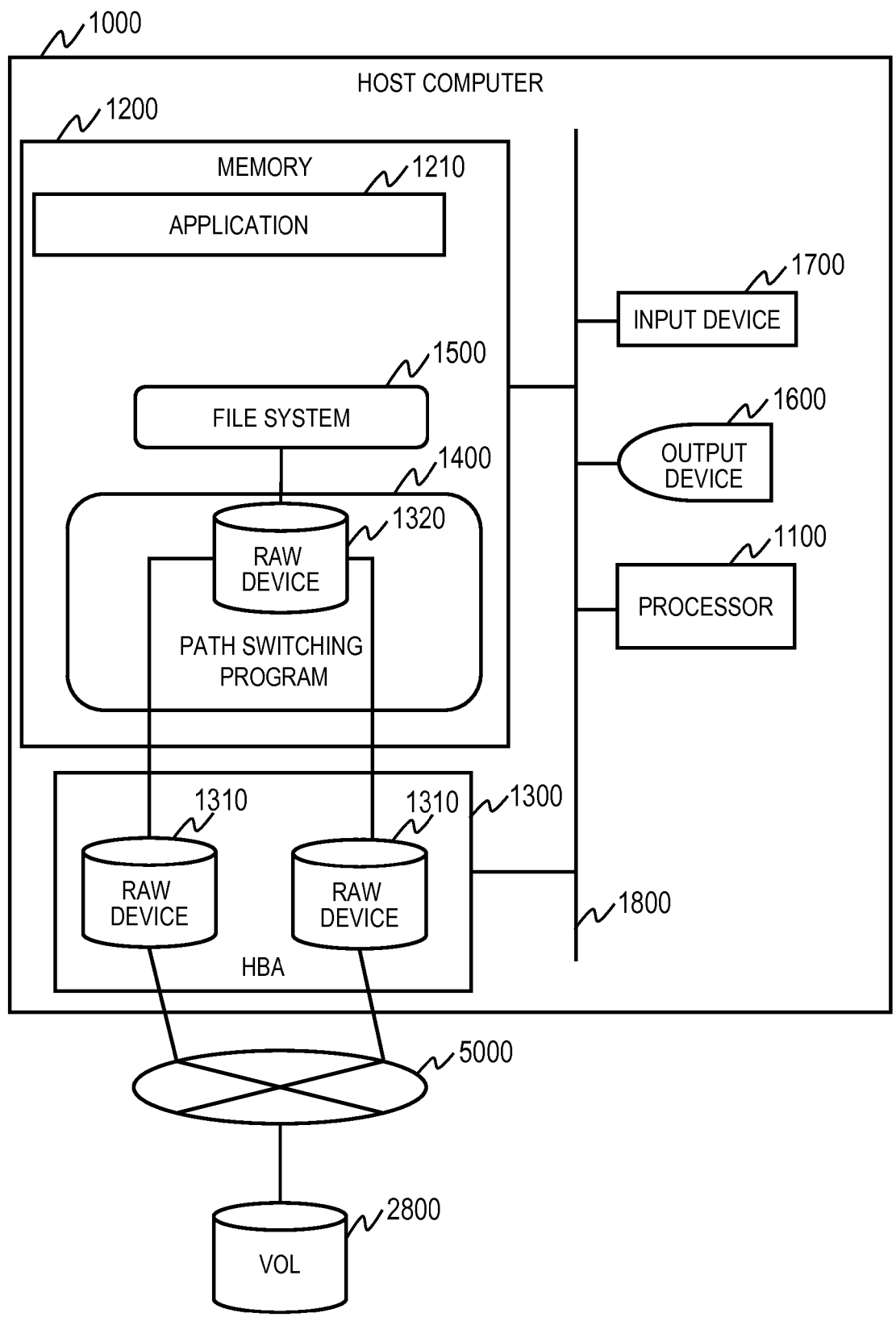
FIG. 2 is a block diagram for illustrating a configuration of a host computer in Example 1.

Hereinafter, a virtualization method to establish the configuration of FIG. 1 is described. First, an exemplary configuration of the host computer 1000 is described. FIG. 2 is a block diagram schematically illustrating an exemplary configuration of the host computer 1000. The host computer 1000 is a computer including a processor 1100, a memory 1200, an HBA (Host Bus Adapter) 1300, an input device 1700, and an output device 1600; it may be a personal computer, a workstation, or a mainframe.

The processor 1100 has a function to control the overall host computer 1000 and runs an application 1210, a path switching program 1400 and an OS including a file system 1500 held in a memory 1200 to execute various control processes.

For example, the processor 1100 runs the application 1210 and issues an access request, such as a read access request or a write access request, to the storage apparatus 2000. The memory 1200 is used to store programs and further, is used as a work memory for the processor 1100.

The HBA 1300 performs protocol control in communication with the storage apparatus 2000. The protocol control performed by the HBA 1300 enables the host computer 1000 and the storage apparatus 2000 to send and receive data and commands between them in accordance with a protocol such as Fiber Channel Protocol.

A raw device 1310 is used as a device for performing I/Os (Inputs/Outputs) without copying data to a page cache (not shown) in accessing the file system 1500 to achieve a lower overhead.

The path switching program 1400 acquires the identifiers of access volumes 2800 with the raw devices 1310 and unifies the raw devices 1310 for volumes 2800 having the same identifier as a single raw device 1320. It issues I/O requests to one or more raw devices 1310 in response to an I/O issuance request from the file system 1500.

The volume identifiers acquired by the path switching program 1400 should be globally-unique values; each of them may be composed of the combination of the identifier of the storage apparatus and a local volume identifier in the storage apparatus. The storage apparatus 2000 returns a virtual identifier for a volume identifier. This will be described later.

The input apparatus 1700 may include a keyboard, a switch, a pointing device, a microphone, and the like. The output device 1600 includes a monitor display, a speaker, and the like.

Figure 3:
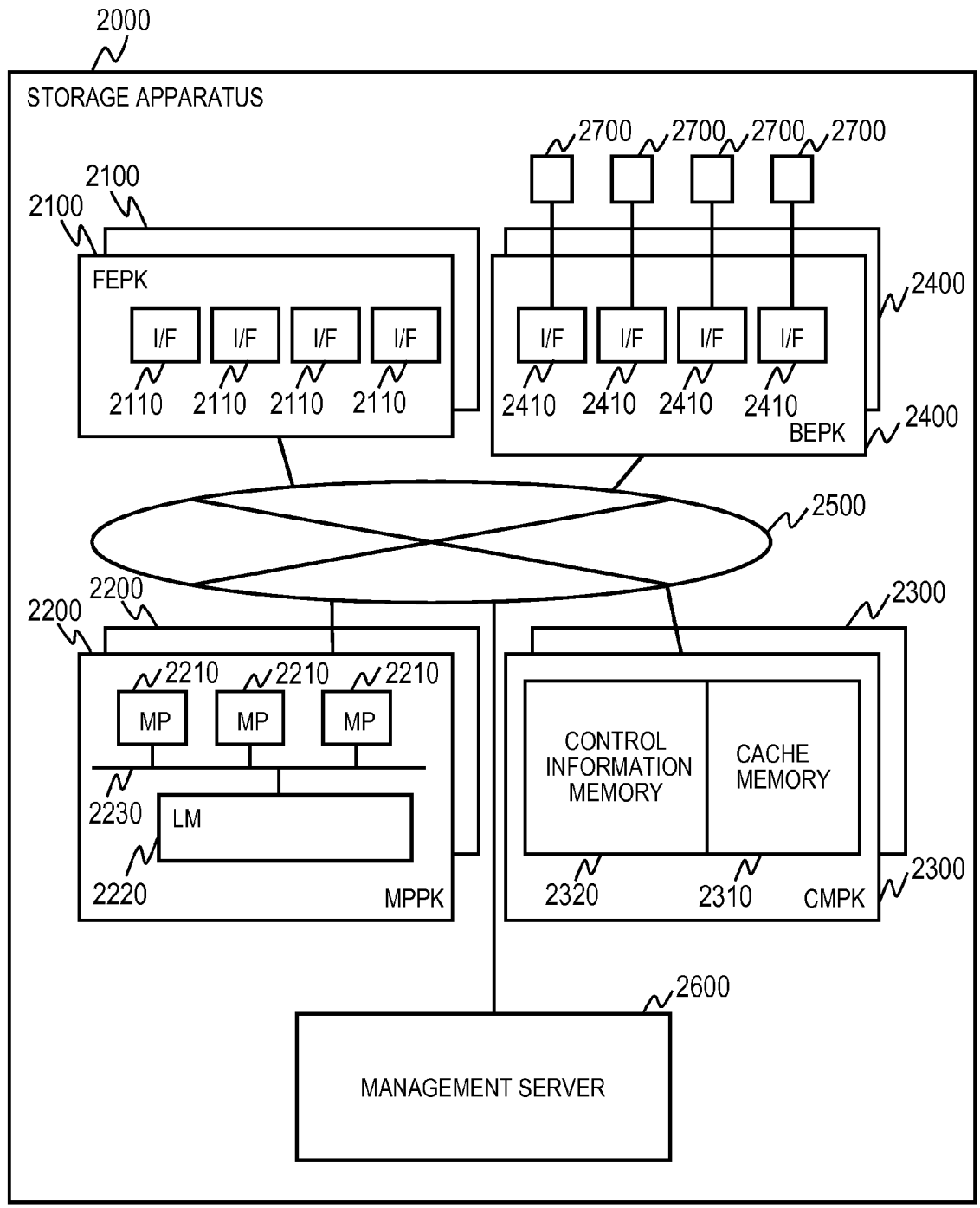
FIG. 3 is a block diagram for illustrating a configuration of a real storage apparatus in Example 1.

FIG. 3 is a block diagram schematically illustrating a hardware configuration of the storage apparatus 2000. As shown in FIG. 3, the storage apparatus 2000 includes FEPKs (FrontEnd PacKages) 2100, MPPKs 2200, CMPKs 2300, BEPKs (BackEnd PacKages) 2400, HDDs (Hard Disk Drives) 2700 representing storage devices, and a management server 2600.

An internal network 2500 connects the FEPKs 2100, the MPPKs 2200, the CMPKs 2300, the BEPKs 2400, and the management server 2600. The internal network 2500 enables each MP 2210 in the MPPKs 2200 to communicate with all of the FEPKs 2100, the CMPKs 2300, the BEPKs 2400, and the management server 2600.

FIG. 3 shows only part of the elements in the packages of the FEPKs 2100, the MPPKs 2200, the CMPKs 2300, and the BEPKs 2400; these packages can further include elements other than the elements shown in the drawing.

The FEPKs 2100 are interface units for communicating with the host computer 1000. An FEPK 2100 has a plurality of host I/Fs 2110. The host I/Fs 2110 connect to the HBA of the host computer 1000 via the network 5000 and perform protocol control for the communication with the host computer 1000. Typically, one host I/F 2110 corresponds to one port. The host I/F 2110 may have a plurality of ports. The FEPK 2100 further includes a not-shown transfer circuit.

The BEPKs 2400 are interface units for communicating with the HDDs 2700. A BEPK 2400 has a plurality of disk I/Fs 2410. The disk I/Fs 2410 are connected to the HDDs 2700 with cables, and are also connected to the internal network 2500; they mediate data to be read or written between the internal network 2500 and the HDDs 2700.

The CMPKs 2300 are shared memory units including a data cache memory 2310 and a control information memory 2320. In a CMPK 2300, the data cache memory 2310 and the control information memory 2320 are non-volatile memories or volatile memories such as DRAMs (Dynamic Random Access Memories).

The data cache memory 2310 tentatively stores (caches) data to be written to an HDD 2700 and tentatively stores (caches) data read from an HDD 2700. The control information memory 2320 stores information required for processing in the storage apparatus 2000, such as resource configuration information and other information. The information to be stored in the control information memory 2320 will be described later.

An MPPK 2200 includes a plurality of MPs (MicroProcessors) 2210, an LM (Local Memory) 2220, and a bus 2230 connecting these. The LM 2220 holds part of the control information held in the control information memory 2320. In this example, a processor can be composed of one or more MPs or one or more MPPKs.

The management server 2600 forwards a user operation request from the management client PC 9000 to a control program which has been loaded from the control information memory 2320 to the LM 2220 and is being executed by an MP 2210. For example, the management server 2600 may be a computer and have an input device such as a keyboard, a switch, a pointing device, and a microphone and an output device such as a monitor display and a speaker (not shown).

As described above, the management server 2600 performs access control for the administrators 8000 and 8500; the access control can employ a technique of role-based access control, for example.

Figure 4:
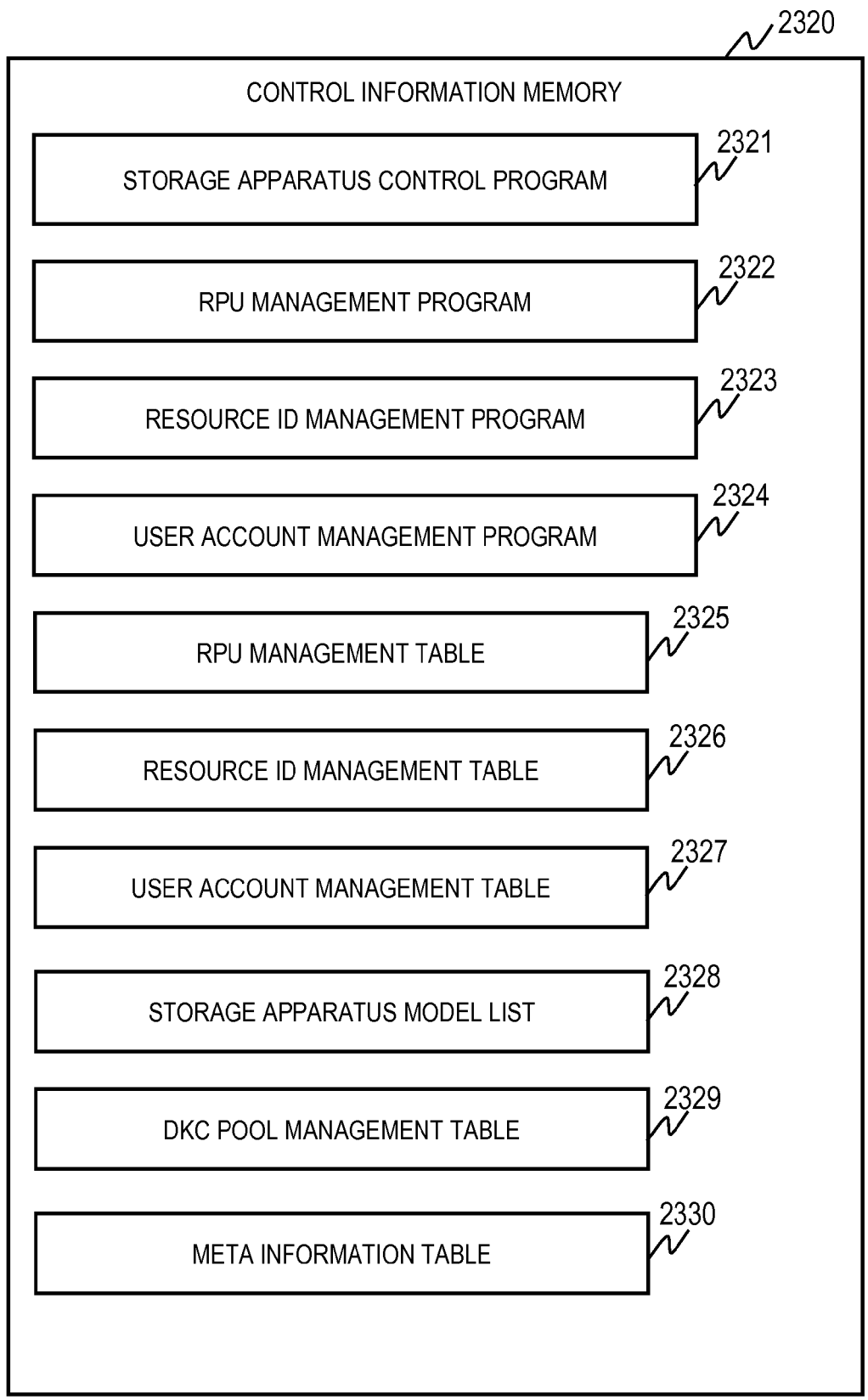
FIG. 4 is a configuration diagram for illustrating information held in a control information memory in the real storage apparatus in Example 1.

FIG. 4 illustrates exemplary information held in the control information memory 2320. In this example, the control information memory 2320 holds a storage apparatus control program 2321, an RPU management program 2322, a resource ID management program 2323, and a user account management program 2324.

The storage apparatus control program 2321 processes read access requests and write access requests from the host computer 1000 and further performs various operations in the storage apparatus 2000.

The RPU management program 2322 manages RPUs in the storage apparatus 2000. The resource ID management program 2323 manages real resource identifiers and virtual resource identifiers assigned to the resources in the storage apparatus 2000. The user account management program 2324 performs user authentication and manages user accounts in the storage apparatus 2000, particularly information on access permissions for the users.

The control information memory 2320 further holds control information to be used by the control programs: an RPU management table 2325, a resource ID management table 2326, a user account management table 2327, a storage apparatus model list 2328, a DKC (Disk Controller) pool management table 2329, and a meta information table 2330. The DKC pool management table 2329 and the meta information table 2330 are not used in Example 1 but are shown for convenience. The details of the DKC pool management table 2329 and the meta information table 2330 are described in Example 2.

FIG. 5 illustrates an exemplary configuration of the user account management table 2327, which is used in the role-based access control by the management server 2600. The user account management table 2327 has a column of user IDs 2327A for storing user IDs of administrators, a column of RPU IDs 2327B for storing IDs of RPUs allocated to the user IDs (administrators), a column of permission levels 2327C for storing the levels of operation permission assigned to the user IDs, and a column of passwords 2327D for storing passwords associated with the user IDs.

A user has registered permissions only to the one or more RPUs that are registered for the user in the user account management table 2327 but does not have any permission to the RPUs that are not registered for the user.

For example, the administrator ADMIN1 (for example, the administrator 8000 in FIG. 1) has a permission level of STORAGE ADMIN only for the RPU #01. The administrator ADMIN3 (for example, the administrator 8500 in FIG. 1) has permission levels of STORAGE ADMIN and MODIFY VIRTUAL STORAGE for all the RPUs (to be a global administrator). The FF in the RPU ID column 2327B represents all RPUs.

A user having a permission level of STORAGE ADMIN can perform any operation within the allocated RPU (virtual storage apparatus). For example, the user having this permission level is allowed to create a volume, delete a volume, and control copy pairs.

The user having this permission level cannot control the physical resources of RPUs; for example, the user cannot create an RPU or change (add or delete) a physical resource of an RPU. In addition, the user cannot change the specification of a virtual storage apparatus. In this description, the physical resources of an RPU are ports and parity groups. Volumes are logical resources and the user having the permission level of STORAGE ADMIN can manipulate them.

A user having a permission level of MODIFY VIRTUAL STORAGE can create or modify a virtual storage apparatus. The user having this permission level is allowed to create a new RPU, change a physical resource (allocate a resource) in an RPU, define a new virtual storage apparatus and allocate an RPU, and modify the specification of a virtual storage apparatus.

The changing a physical resource in an RPU means transferring the physical resource from an RPU to another. Accordingly, to change a physical resource in an RPU, the user is required to have the permission level of MODIFY VIRTUAL STORAGE for the other RPU. The kinds and terms of user permission levels in this example are merely examples only; permission levels different from these may be defined.

The user account management program 2324 registers a user account in the user account management table 2327 in accordance with an instruction from the management client PC 9000. Specifically, the management server 2600 receives an instruction for addition, change, or deletion of a user account together with information for the details of the registration and transfers them to the user account management program 2324 that has started. The user account management program 2324 updates the user account management program 2324 in accordance with the transferred instruction.

As described above, the management server 2600 controls accesses from users in accordance with the information in the user account management table 2327. For example, the management server 2600 receives a user ID and a login password from the management client PC 9000 and transfers them to the user account management program 2324.

The user account management program 2324 compares the acquired user ID and password with the information in the user account management table 2327 to check whether a user having the acquired user ID is in registration in the user account management table 2327. If such a user is in registration, the user account management program 2324 transmits the result of the authentication and permission information for the user to the management server 2600. If such a user is not in registration, the user account management program 2324 transmits the result of the authentication to the management server 2600.

If the logging-in user is an unregistered user, the management server 2600 returns a login error to the management client PC 9000. If the user is a registered user, the management server 2600 processes management commands subsequently received from the user within the permission range of the user. As described above, the management server 2600 restricts the targets of management operation for a user to the resources of the RPU allocated to the account of the user and restricts the executable operations for the user to the operations permitted by the permission level assigned to the user.

For example, the management server 2600 rejects a request from a user for volume manipulation (such as creation or deletion of a volume or creation of a pair) in a virtual storage apparatus of an RPU which is not allocated to the user. The management server 2600 also rejects a request for creation of a virtual storage apparatus or transfer (allocation) of a resource from a user who does not have the permission level of MODIFY VIRTUAL STORAGE.

FIG. 6 illustrates an exemplary configuration of the RPU management table 2325. The RPU management table 2325 stores configuration information on individual RPUs configured in the storage apparatus 2000. The RPU management program 2322 updates the RPU management table 2325.

In FIG. 6, the RPU management table 2325 has a column of RPU IDs 2325A, a column of vendors 2325B, a column of models 2325C, a column of S/Ns (Serial Numbers) 2325D, a column of port IP addresses 2325E, a column of the number of volumes 2325F, a column of the number of ports 2325G, a column of the number of parity groups 2325H, and a column of statuses 2325I. In the RPU management table 2325, a value 0 means that no value has been assigned.

The RPU ID column 2325A stores identifiers for uniquely identifying RPUs in the storage apparatus 2000. The vendor column 2325B, the model column 2325C, the S/N (serial number) column 2325D respectively store virtual vendor names (virtual identifiers of the vendors), virtual model names (virtual identifiers of the models), and virtual serial numbers (virtual identifiers of the serial numbers) of the virtual storage apparatuses represented by the RPUs (the virtual storage apparatuses to which the RPUs are allocated).

These three values can compose a virtual identifier for identifying a virtual storage apparatus. The virtual identifier of a virtual storage apparatus is unique to the storage apparatus 2000. It should be noted that a value DEFAULT in the vendor column 2325B, the model column 2325C, or the serial number column 2325D means that a real value for the storage apparatus 2000 has been assigned.

The management port IP address column 2325E stores IP addresses to access the management server 2600 that are defined for RPU management. For example, in one physical port, access IP addresses are masqueraded so that each virtual storage apparatus is assigned an access IP address.

The number of volumes column 2325F stores the maximum number of volumes to be allocated to the individual RPUs and the maximum number of volumes for the virtual storage apparatus models represented by the individual RPUs (values in the parentheses). For example, the maximum number of volumes that the virtual storage apparatus model having an RPU ID=01 can create within the specification limits is 65536. The maximum number of volumes that the virtual storage apparatus having the RPU ID=01 can create is 8192. Among virtual storage apparatuses of the same model (the same model of the same vendor), the maximum number of volumes that can be created may be different depending on the design (definition) of the virtual storage apparatus.

The number of ports column 2325G stores the maximum number of ports to be allocated to the individual RPUs and the maximum number of ports for the virtual storage apparatus models represented by the individual RPUs (values in the parentheses). For example, the maximum number of ports that the virtual storage apparatus model having an RPU ID=01 can mount within the specification limits is 255.

The maximum number of ports that the virtual storage apparatus having an RPU ID=01 can include is 128. Since the RPU #01 represents a virtual storage apparatus, the number of ports in the RPU #01 may change (increase or decrease). Accordingly, the actual number of ports in the RPU #01 is any number not more than 128.

The number of parity groups column 2325H stores the maximum number of parity groups to be allocated to the individual RPUs and the maximum number of parity groups for the virtual storage apparatus models represented by the RPUs (values in the parentheses). For example, the maximum number of parity groups that the virtual storage apparatus model having an RPU ID=01 can have within the specification limits is 65536.

The maximum number of parity groups that the virtual storage apparatus having the RPU ID=01 can include is 16384. Since the RPU #01 represents a virtual storage apparatus, the number of parity groups in the RPU #01 may change (increase or decrease). Accordingly, the actual number of parity groups in the RPU #01 is any number not more than 16384.

The status column 2325I stores values indicating the statuses of individual RPUs. If the RPU status is ACTIVE, the particular RPU is representing a virtual storage apparatus, meaning the virtual storage apparatus is active, and the storage apparatus 2000 returns its virtual identifier (including the virtual identifier of the virtual storage apparatus and the virtual resource identifiers of the virtual resources therein) to the host computer 1000 and the management client PC 9000.

If the RPU status is INACTIVE, the particular RPU is not representing a virtual storage apparatus and the virtual storage apparatus is inactive. The storage apparatus 2000 does not return the virtual identifier of the RPU in response to an identifier report request from the host computer 1000 or the management client PC 9000.

FIG. 7 illustrates an exemplary configuration of the resource ID management table 2326, which manages the IDs (IDentifiers) of resources. The resource ID management table 2326 has a column of real resource IDs 2326A, a column of types 2326B, a column of RPU IDs 2326C, and a column of virtual resource IDs 2326D.

The real resource ID column 2326A stores identifiers (real resource identifiers) assigned to individual resources in the namespace defined for the storage apparatus 2000 (real storage apparatus). The real resource identifiers can uniquely identify the resources in the storage apparatus 2000.

The type column 2326B indicates the types of the individual resources. The types registered in this example are port, volume, and parity group. Types different from these may be registered. The RPU ID column 2326C stores identifiers of the RPUs the individual resources belong to. In this example, each of all the registered resource belongs to any one of the RPUs.

The virtual resource ID column 2326D stores virtual resource identifiers assigned to the resources. A virtual identifier (ID) represents the virtual identifier (ID) of a virtual storage apparatuses or the virtual resource identifier (ID) assigned to a resource.

In the virtual resource ID column 2326D, a value NULL means that no virtual resource identifier has been assigned. Some resources have been assigned virtual resource identifiers and the other resources have not been assigned. The virtual resource identifiers are identifiers in the namespace defined for an RPU.

The virtual resource identifiers can uniquely identify the resources in an RPU. In an RPU representing a virtual storage apparatus, only some of the resources may be assigned virtual resource identifiers and the rest of the resources may not be assigned virtual resource identifiers. A resource which does not have a virtual resource identifier is not recognized by the host computer 1000 or the management client PC 9000 as a resource of a virtual storage apparatus even if the RPU including the resource is ACTIVE.

To assign virtual resource identifiers in RPUs, a namespace is defined for each RPU. For this reason, in each RPU (virtual storage apparatus), virtual resource identifiers can be assigned to the resources independently from the virtual resource identifiers in the other RPUs and the real resource identifiers assigned in the real storage apparatus 2000. Consequently, virtual resource identifiers can be freely assigned in each RPU and the management to provide a plurality of virtual storage apparatuses in the real storage apparatus 2000 is facilitated.

The RPU IDs are unique to the storage apparatus 2000; an identifier composed of an RPU ID and a virtual resource identifier can uniquely identify a resource in the storage apparatus 2000 like a real resource identifier. In similar, a virtual identifier composed of a virtual vendor ID, a virtual model name, and a virtual serial number of the virtual storage apparatus represented by an RPU and a virtual resource identifier can uniquely identify a resource in the storage apparatus 2000.

The resource ID management program 2323 manages the resource ID management table 2326. Through the later-described operations, a resource is transferred from an RPU to another and is assigned a virtual resource identifier. When such a resource configuration change occurs, the resource ID management program 2323 updates the resource ID management table 2326 in accordance with the change.

FIG. 8 is a storage apparatus model list 2328 for registering vendor names and model names of the virtual storage apparatuses that can be represented by the RPUs. The storage apparatus model list 2328 has a column of vendors 2328A for registering vendor names to be represented and a column of models 2328B for registering model names according to the vendors registered in the vendor column 2328A.

The administrator can select an entry from the entries of the storage apparatus model list 2328 to assign the vendor name and the model name in the selected entry to a virtual storage apparatus created in the storage apparatus 2000. An RPU can represent a virtual storage apparatus having a combination of a vendor name and a model name registered in the storage apparatus model list 2328.

The resource ID management program 2323 manages the storage apparatus model list 2328. For example, the resource ID management program 2323 updates the storage apparatus model list 2328 in accordance with an instruction received from the management client PC 9000 via the management server 2800.

As previously described, the storage apparatus 2000 returns a virtual identifier in response to a resource identifier report request from the host computer 1000 or the management client PC 9000. It further controls accesses from users (administrators) in accordance with their permission levels for the RPUs. The storage apparatus 2000 uses these two functions to provide a plurality of virtual storage apparatuses in addition to itself (the storage apparatus 2000). Hereinafter, processing in the storage apparatus 2000 providing virtual storage apparatuses is specifically described.

Figure 9:
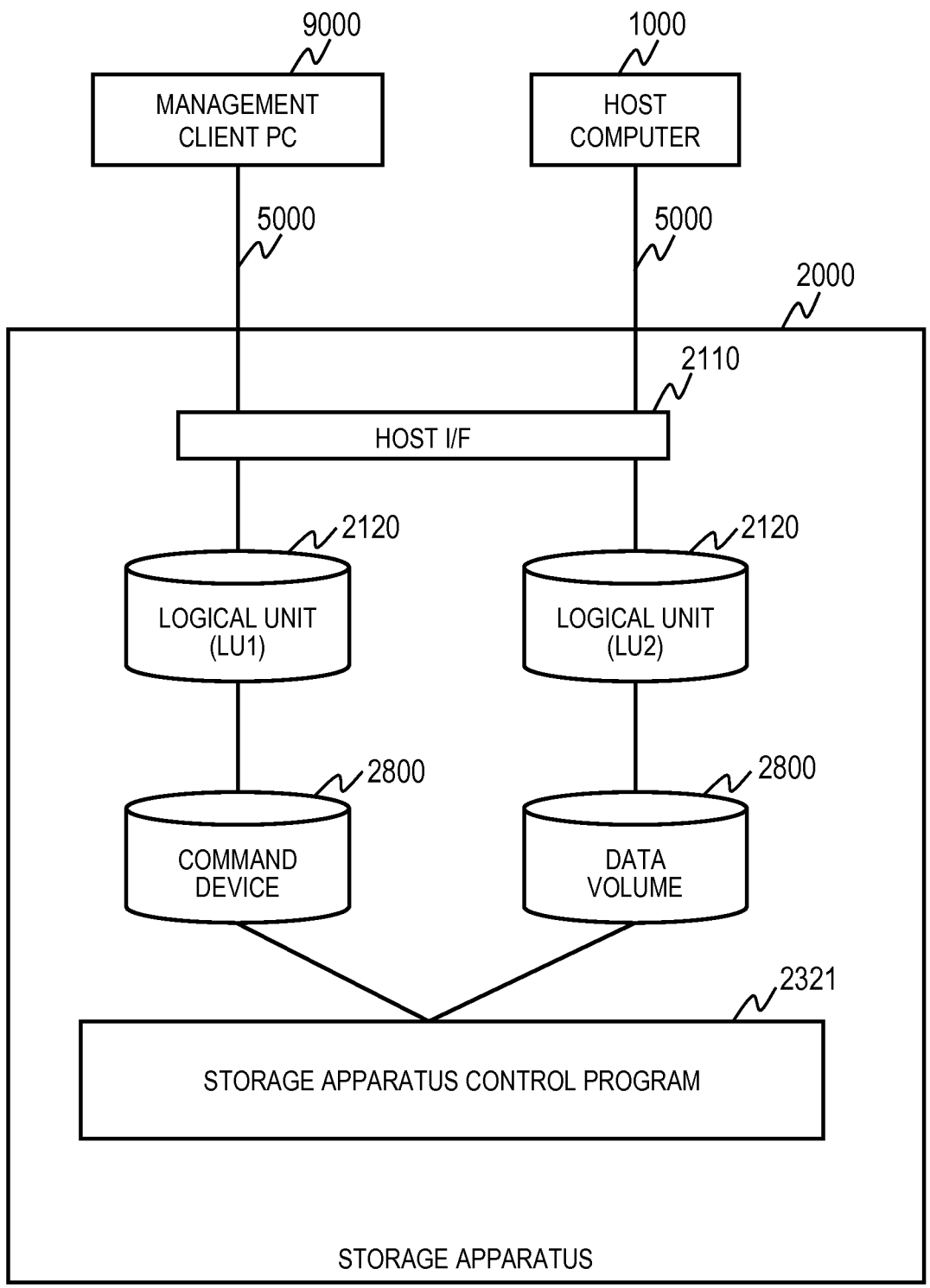
FIG. 9 is a diagram illustrating an exemplary configuration of logical devices for processing a SCSI command in Example 1.

Processing a SCSI (Small Computer System Interface) command issued by the host computer 1000 or the management client PC 9000 is described. The processing is performed by the storage apparatus 2000. FIG. 9 is a drawing schematically illustrating an exemplary configuration of logical devices (volumes) for processing a SCSI command. In FIG. 9, one host I/F 2110 is connected to the host computer 1000 and the management client PC 9000; however, a plurality of host I/Fs 2110 may be separately connected to the host computer 1000 and the management client PC 9000.

The host computer 1000 and the management client PC 9000 configure logical paths targeted at the WWN (World Wide Name) of the host I/F 2110 in the network 5000 and they issues a SCSI command designating the number (LU number) of an LU (Logical Unit) 2120 to their own logical path. The WWN is composed of the virtual identifier of the virtual storage apparatus and the virtual resource identifier of the port.

If the SCSI command includes a data read/write request for a data volume (LDEV) 2800, it further designates the LBA (Logical Block Address) of the access target.

The transfer circuit of the FEPK 2100 that has received the SCSI command via the host I/F 2110 analyzes the SCSI command and identifies the MPPK 2220 to process the command from the designated LU number. The transfer circuit has management information for managing the relationships between LU numbers and MPPKs 2220; it refers to the management information to identify the MPPK 2220 to process the command for the LU 2120 having the designated LU number.

The transfer circuit of the FEPK 2100 issues an operation request specified by the SCSI command to the identified MPPK 2220. In the MPPK 2220 that has received the operation request, the storage apparatus control program 2321 is started. The storage apparatus control program 2321 identifies the volume (LDEV) corresponding to the LU 2120 from the designated LU number and determines the kind of operation designated by the SCSI command.

The control information memory 2320 holds management information for managing the relationships between logical units (identified with allocated ports and LU numbers) and volumes (identified with real resource identifiers); the storage apparatus control program 2321 refers to the management information to identify the volume corresponding to the designated LU number. This management information includes information on the type of volume.

Now, it is assumed that the operation request included in the SCSI command is for data read or data write and the designated LU number indicates the logical unit (LU2) 2120. The storage apparatus control program 2321 requests the BEPK 2400 associated with the data volume 2800 to read data from or to write data to the storage area corresponding to the data volume 2800 and the LBA specified by the SCSI command.

Next, it is assumed that the operation request included in the SCSI command is a resource identifier report request such as a SCSI Inquiry ID (IDentifier). The storage apparatus 2000 returns a virtual identifier in response to the resource identifier report request.

Specifically, when the SCSI command has been transferred to the relevant MPPK 2220, the storage apparatus control program 2321 determines that the operation request designated by the SCSI command is a SCSI Inquiry ID. The storage apparatus control program 2321 requests identifier information on the LU number designated by the SCSI command to the resource ID management program 2323.

For example, the storage apparatus control program 2321 refers to the aforementioned management information to acquire the real resource identifier of the volume from the designated LU number and requests information on the virtual identifier to the resource ID management program 2323 with designation of the real resource identifier.

The resource ID management program 2323 refers to the resource ID management table 2326 in response to the request from the storage apparatus control program 2321 to search for the designated real resource identifier. The resource ID management program 2323 acquires the RPU ID (the column 2326C) and the virtual resource identifier (the column 2326D) from the entry including the designated real resource identifier.

The resource ID management program 2323 further refers to the RPU management table 2325 to search for the RPU ID acquired from the resource ID management table 2326. The resource ID management program 2323 acquires the vendor name (the column 2325B), the model name (the column 2325C), and the serial number (the column 2325D) from the entry of the RPU ID in the RPU management table 2325.

The resource ID management program 2323 returns the acquired vendor name, model name, and serial number (virtual storage apparatus identifier) and the acquired virtual volume ID to the storage apparatus control program 2321. The storage apparatus control program 2321 includes the acquired identifier of the virtual storage apparatus and virtual volume ID in the inquiry data and returns it to the requestor.

The virtual identifiers included in a response to a resource identifier report request depend on the design. The resource identifier report can include only part of the aforementioned virtual identifiers and can include virtual identifiers different from those. For example, a resource identifier report may include only the virtual resource identifier of the volume (LDEV) and the virtual serial number (this is a kind of virtual identifier) of the virtual storage apparatus. In another example, the resource identifier report may include the virtual resource identifier of the port the designated logical unit belongs to.

Next, a case that the LU number designated by the SCSI command is the LU number of the logical unit (LU1) 2120 is described. The volume (LDEV) corresponding to the logical unit (LU1) 2120 is a command device 2800. The command device 2800 is a volume to receive control commands for a virtual or real storage apparatus (RPU) to which it belongs.

Upon receipt of a control command, the storage apparatus control program 2321 requests access control to the management server 2600 with information of the type, the target RPU, and the sender (administrator) of the control command.

The management server 2600 compares the provided information with the information in the user account management table 2327 to perform the aforementioned role-based access control. If the user has a permission to perform the operation requested in the particular control command, the management server 2600 notifies the storage apparatus control program 2321 of it. If the user does not have the permission, it notifies the storage apparatus control program 2321 and the management client PC 9000 of it. The user account management program 2324 may perform the access control for the control command received by the command device 2800.

First, processing a control command requesting a resource manipulation for an existing virtual storage apparatus is described. Examples of the operation requested by a control command for a virtual storage apparatus are creating a volume, formatting the storage area of a volume, and copying data between designated volumes.

When a SCSI command is transferred to the relevant MPPK 2220, the storage apparatus control program 2321 determines that the SCSI command is an apparatus control command since the command is a SCSI command for the command device 2800. The storage apparatus control program 2321 extracts an apparatus manipulation request from the received SCSI command.

The manipulation request includes an identifier for identifying the resource to be manipulated. In this description, the resource to be manipulated is designated by the identifier of the virtual storage apparatus and the virtual resource identifier of the resource to be manipulated. The manipulation requested by the control command is performed with real resource identifiers. Accordingly, the storage apparatus control program 2321 converts the virtual resource ID of the manipulation target designated by the manipulation request into a real resource identifier.

The storage apparatus control program 2321 refers to the RPU management table 2325 to acquire the RPU ID (the column 2325A) associated with the virtual storage identifier including the resource to be manipulated. Furthermore, the storage apparatus control program 2321 refers to the resource ID management table 2326 to acquire the RPU ID (the column 2326C) of the RPU including the command device that has received the control command. For example, the storage apparatus control program 2321 can identify the RPU ID from the real resource identifier of the command device.

The storage apparatus control program 2321 compares the RPU ID of the RPU including the command device with the RPU IDs of the RPUs including the resources designated by the control command. If any one of the RPUs of the designated resources differs from the RPU including the command device, the program 2321 returns an error (inexecutable) to the requestor of the SCSI command.

Through this approach, the resources that can be manipulated in accordance with a control command received by the command device of a virtual storage apparatus can be closed in the RPU including the command device, namely the virtual storage apparatus.

If the RPU IDs of all the RPUs including the resources designated by the control command match with the RPU ID of the RPU including the command device, the storage apparatus control program 2321 carries out the requested manipulation.

The storage apparatus control program 2321 refers to the resource ID management table 2326 to acquire the real resource identifiers (the column 2326A) from the entries including the RPU ID (the column 2326C) of the command device and the virtual resource identifiers (the column 2326D) designated by the control command. The storage apparatus control program 2321 carries out the requested manipulation using the acquired real resource identifiers.

Described above is an example of processing a control command for a virtual storage apparatus with designation of a virtual resource identifier and the target of the manipulation is limited to within the virtual storage apparatus. The control command (special command) acceptable to a command device can include a control command requesting manipulation of an RPU different from the RPU including the command device that receives the command, such as a command to create a virtual storage apparatus, a command to allocate a resource to an RPU (transfer a resource from an RPU to another), and a command to assign a virtual resource identifier, which will be described later, and control commands designating resources with real resource identifiers. Details of processing these commands will be described later.

For example, a command device for the RPU #00 receives a control command for RPU manipulation, such as a command to create a virtual storage apparatus or a command to allocate a resource to an RPU. In processing a control command for the RPU #00, the MPPK 2200 does not limit the resources to be manipulated to the RPU #00. The MPPK 2200 may determine whether to limit the processing of the request to within the RPU including the command device or to permit manipulation of other RPUs, depending on the type of the manipulation requested by the control command.

Hereinafter, configuring a virtual storage apparatus is described. The following example of a method of configuring a virtual storage apparatus performs creating a virtual storage apparatus (FIG. 10), allocating resources to the created virtual storage apparatus (RPU) (FIG. 13), and assigning virtual resource identifiers to the newly allocated resources (FIG. 14).

First, the creating a virtual storage apparatus is described. The creating a virtual storage apparatus receives designation of a configuration definition for the virtual storage apparatus to be created and allocates an existing RPU to the virtual storage apparatus.

To create a new virtual storage apparatus, a user account having a permission to create a virtual storage apparatus is necessary. In this example, "MODIFY VIRTUAL STORAGE" (refer to the user account management table 2327) includes a permission to create a virtual storage apparatus.

The administrator logs in the management server 2600 of the storage apparatus 2000 using a user account having the permission to create a virtual storage apparatus. As described above, the management server 2600 controls accesses from administrators by the role-based access control. The management server 2600 permits administrators having a permission level of MODIFY VIRTUAL STORAGE to create a virtual storage apparatus.

Figure 10:
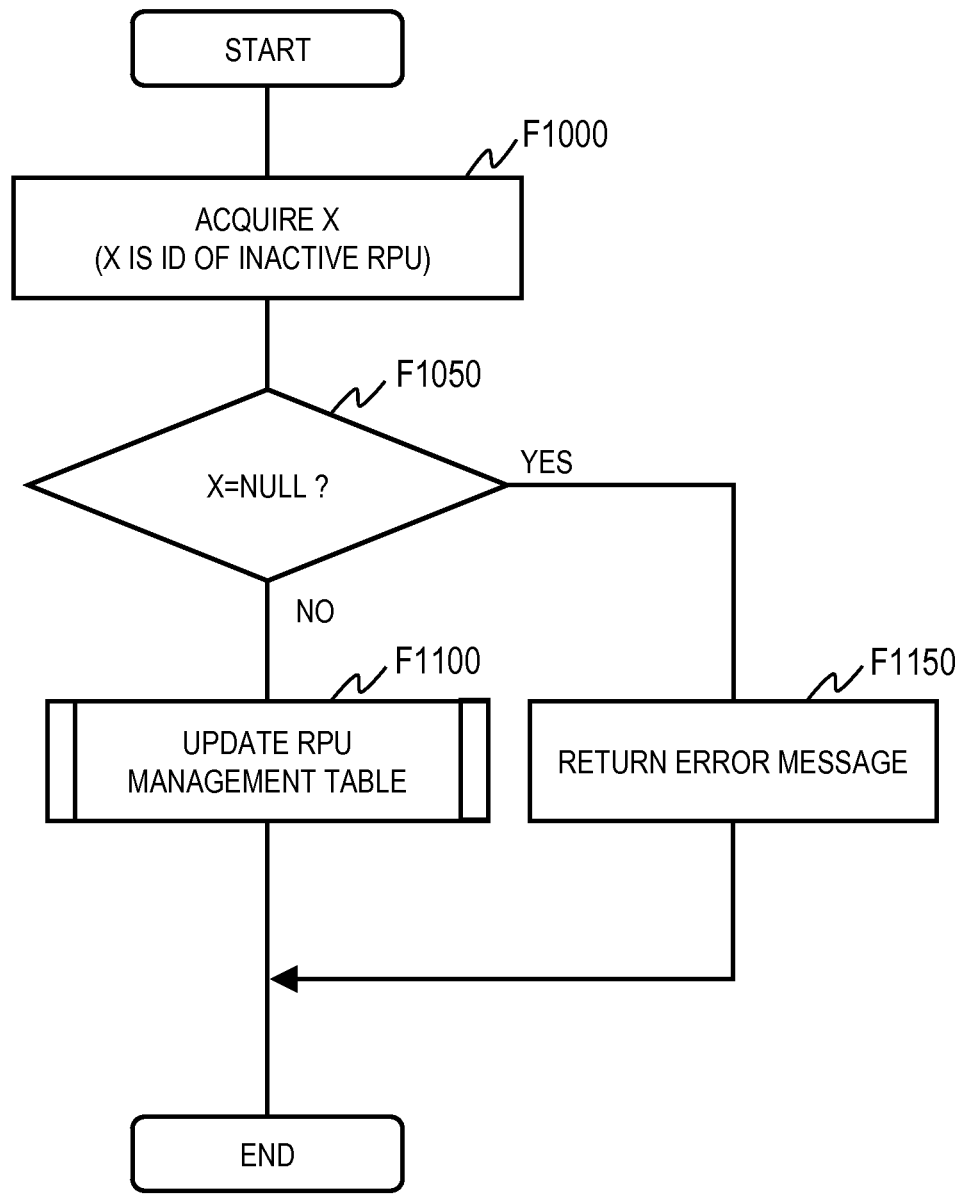
FIG. 10 is a flowchart illustrating creating a virtual storage apparatus in Example 1.

FIG. 10 is a flowchart illustrating exemplary processing to create a virtual storage apparatus. The RPU management program 2322 follows this flowchart to create a virtual storage apparatus. The management server 2600 or a command device 2800 receives a virtual storage apparatus creation request from the management client PC 9000. For example, the command device of RPU #00 receives a control command including a virtual storage apparatus creation request and the storage apparatus control program 2321 requests access control for the virtual storage apparatus creation request to the management server 2600.

If the request is from an administrator having a permission to create a virtual storage apparatus, the storage apparatus control program 2321 or the management server 2600 that has received the virtual storage apparatus creation request invokes the RPU management program 2322 and forwards the information indicated by the request.

The RPU management program 2322 refers to the RPU management table 2325, selects one of the RPU IDs (the column 2325A) of the entries showing the status (the column 2325I) of INACTIVE, and assigns it to a variable X (Step F1000). The initial value of the variable X is NULL; if no entry meets the foregoing condition, the NULL is maintained.

If the X is NULL (YES at Step F1050), all the RPUs are in use, so that a new virtual storage apparatus cannot be configured. The RPU management program 2322 returns an error of "UNABLE TO CREATE" to the requestor via the management server 2600 or the storage apparatus control program 2321 (Step F1150). If an RPU ID is assigned to the X (NO at Step F1050), the RPU management program 2322 updates the RPU management table 2325 (Step F1100).

Figure 11:
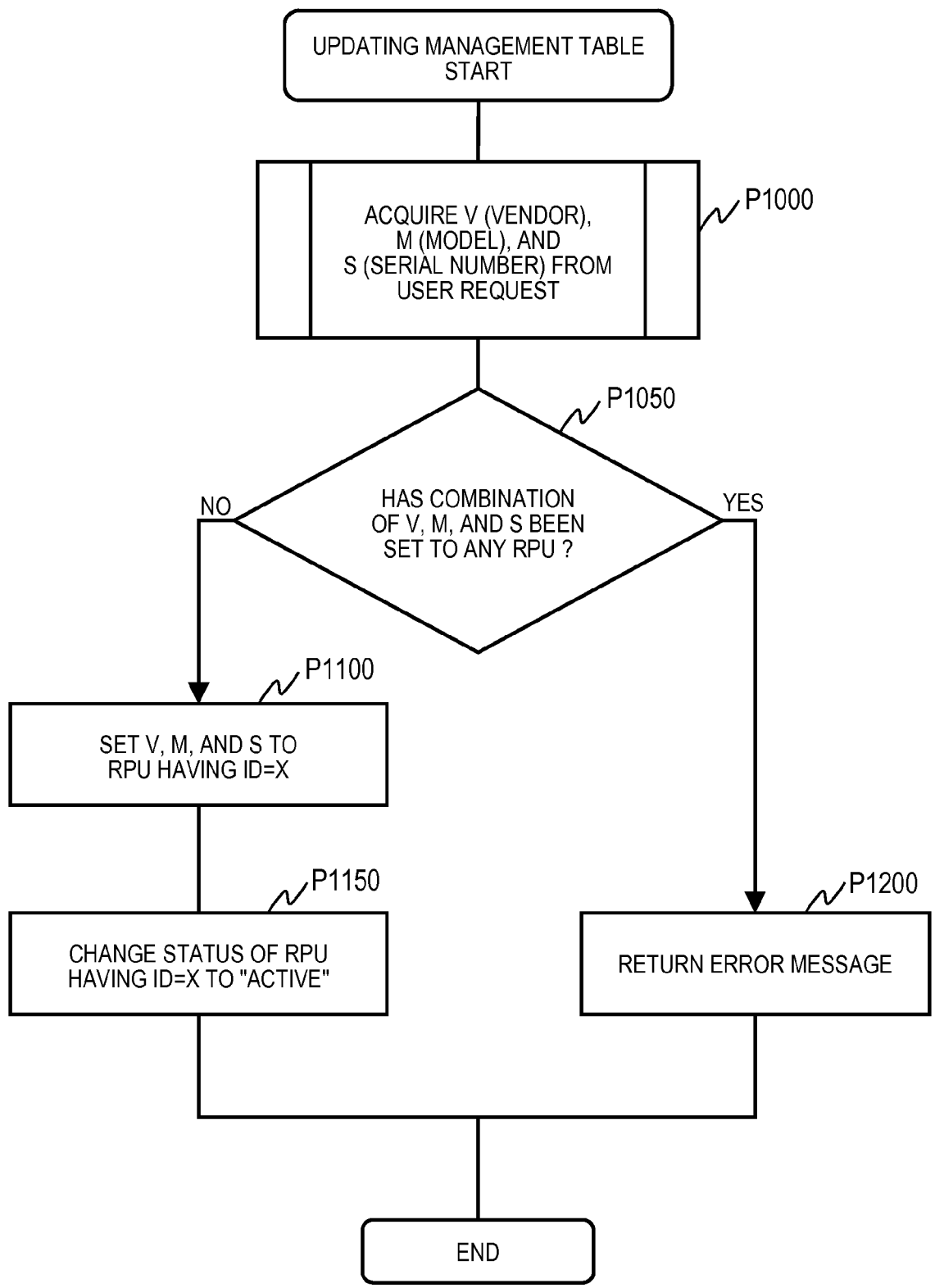
FIG. 11 is a flowchart illustrating updating the RPU management table in the creating a virtual storage apparatus in Example 1.

FIG. 11 is a flowchart illustrating the updating the RPU management table 2325 (Step F1100) in the creating a virtual storage apparatus. First, the RPU management program 2322 acquires the vendor name, the model name, the serial number for the new virtual storage apparatus included in the virtual storage apparatus creation request of the administrator (Step P1000). Hereinafter, these are denoted by V, M, and S. The combination of these values (V, M, S) is the designated virtual storage apparatus identifier.

The RPU management program 2322 refers to the columns 2325B, 2325C, and 2325D of the RPU management table 2325 and checks whether the acquired combination of values (V, M, S) has been set to any RPU entry (Step P1050).

If the acquired combination of values has been set to some RPU entry (YES at P1050), a virtual storage apparatus having the same virtual identifier as the requested virtual storage identifier already exists. Accordingly, the RPU management program 2322 notifies the requestor that a virtual storage apparatus having the requested identifier already exists via the management server 2600 or the storage apparatus control program 2321 and terminates the creating a virtual storage apparatus (Step P1200).

If the acquired combination of values has not been set to any RPU entry (NO at P1050), the RPU management program 2322 stores the individual values of the acquired combination (V, M, S) in the columns of 2325B to 2325D of the entry including the RPU ID selected at Step F1000 in the RPU management table 2325. Furthermore, the RPU management program 2322 changes the value in the column 2325I of this entry in the RPU management table 2325 to ACTIVE (Step P1150). Through these steps, the creating a virtual storage apparatus is completed.

After Step P1150, the host computer 1000 and the management client PC 9000 can recognize the virtual storage apparatus which has been allocated the RPU selected at Step F1000.

FIG. 12 illustrates an exemplary view of a virtual storage apparatus management window V1000. The management client PC 9000 can show this window on its display device when it receives information from the management server 2600. The virtual storage apparatus management window V1000 includes a table V1010 listing virtual storage apparatuses existing in the storage apparatus 2000 and a text box V1020 indicating the number of virtual storage apparatuses existing in the storage apparatus 2000.

The user can find the virtual storage apparatuses in the storage apparatus 2000 from the table V1010 and the text box V1020. In the indication style of the text box V1020, the numerator represents the number of existing virtual storage apparatuses and the denominator represents the maximum number of virtual storage apparatuses that can be provided in the storage apparatus 2000, namely the number of RPUs excluding the RPU #00.

The storage apparatus management window V1000 further includes entry boxes V1030 to V1090 to input information required to create a new virtual storage apparatus, a button V1100 for sending a virtual storage apparatus creation request, a button V1110 to cancel the inputs, and a button V1120 to exit the virtual storage apparatus management window V1000. The administrator can input necessary information with the input device of the management client PC 9000.

For example, the administrator selects a vendor name for the virtual storage apparatus to be created at the entry box V1030, selects a model name at the entry box V1040, and types in a serial number at the entry box V1050. The administrator can select values only from the registrations of the storage apparatus model list 2328 at the entry boxes V1030 and V1040.

In another example, the management client PC 9000 has information of the storage apparatus model list 2328 received from the management server 2600 and if the entered combination does not match with any entry in the storage apparatus model list 2328, it determines the designated virtual storage apparatus cannot be emulated in the storage apparatus 2000. Even if the proceed button V1100 is pressed, the management client PC 9000 does not send the virtual storage apparatus creation request to the storage apparatus 2000. This operation may be performed by the storage apparatus 2000.

The entry box V1060 is a box to input the IP address of the management port to access the management function (management server 2600) included in the storage apparatus 2000; the input value is an IP address of the virtual storage apparatus to be created. The entry boxes V1070 to V1090 are entry boxes to input the number of resources for the virtual storage apparatus to be created. The indication styles of these boxes are as described with reference to the RPU management table 2325.

In this way, the administrator inputs configuration information on the virtual storage apparatus to be created through the virtual storage apparatus management window V1000, and presses the button V1100 to send the virtual storage apparatus creation request to the storage apparatus 2000. The management client PC 9000 may receive a request for modification of the configuration of an existing virtual storage apparatus through the virtual storage apparatus management window V1000 for the storage apparatus 2000 and modify the configuration in accordance with the request.

Next, resource allocation to a virtual storage apparatus is described with reference to FIG. 13. The storage apparatus 2000 performs this processing after creating a virtual storage apparatus (allocating an RPU) to change the resource configuration of the RPU allocated to the virtual storage apparatus to a configuration desired by the administrator.

The resources of the storage apparatus 2000 belong to the RPU #00 in the initial state. The resource allocation to a virtual storage apparatus described hereinafter transfers resources from the RPU #00 to the RPU corresponding to the virtual storage apparatus to be allocated. The transfer may be performed from an RPU of a virtual storage apparatus to another.

When later-described assigning virtual resource identifiers to the real resources in the RPU has been performed after the resource transfer, the host computer 1000 and the management client PC 9000 can recognize the newly allocated resources.

Figure 13:
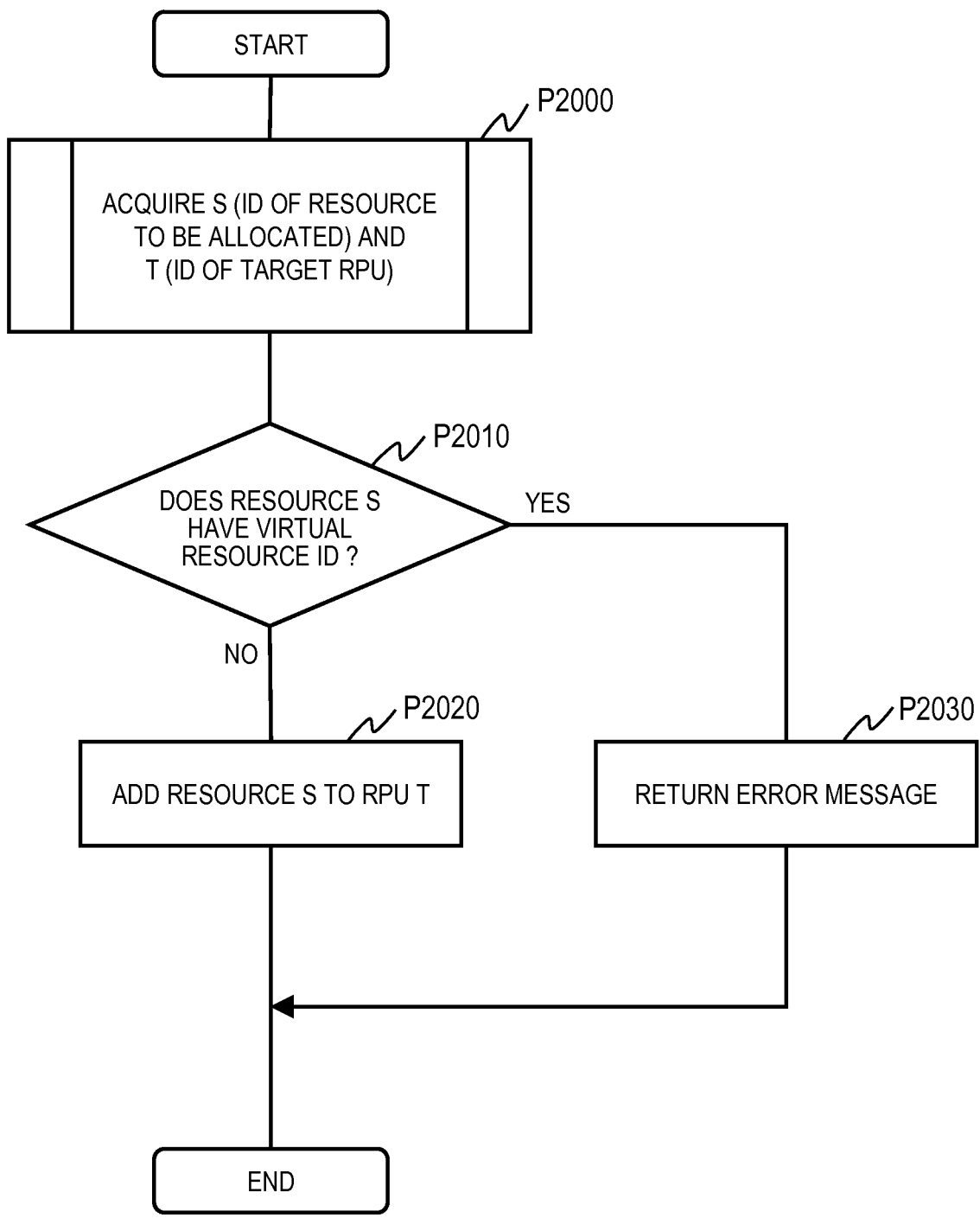
FIG. 13 is a flowchart illustrating allocating a resource in Example 1.
Figure 14:
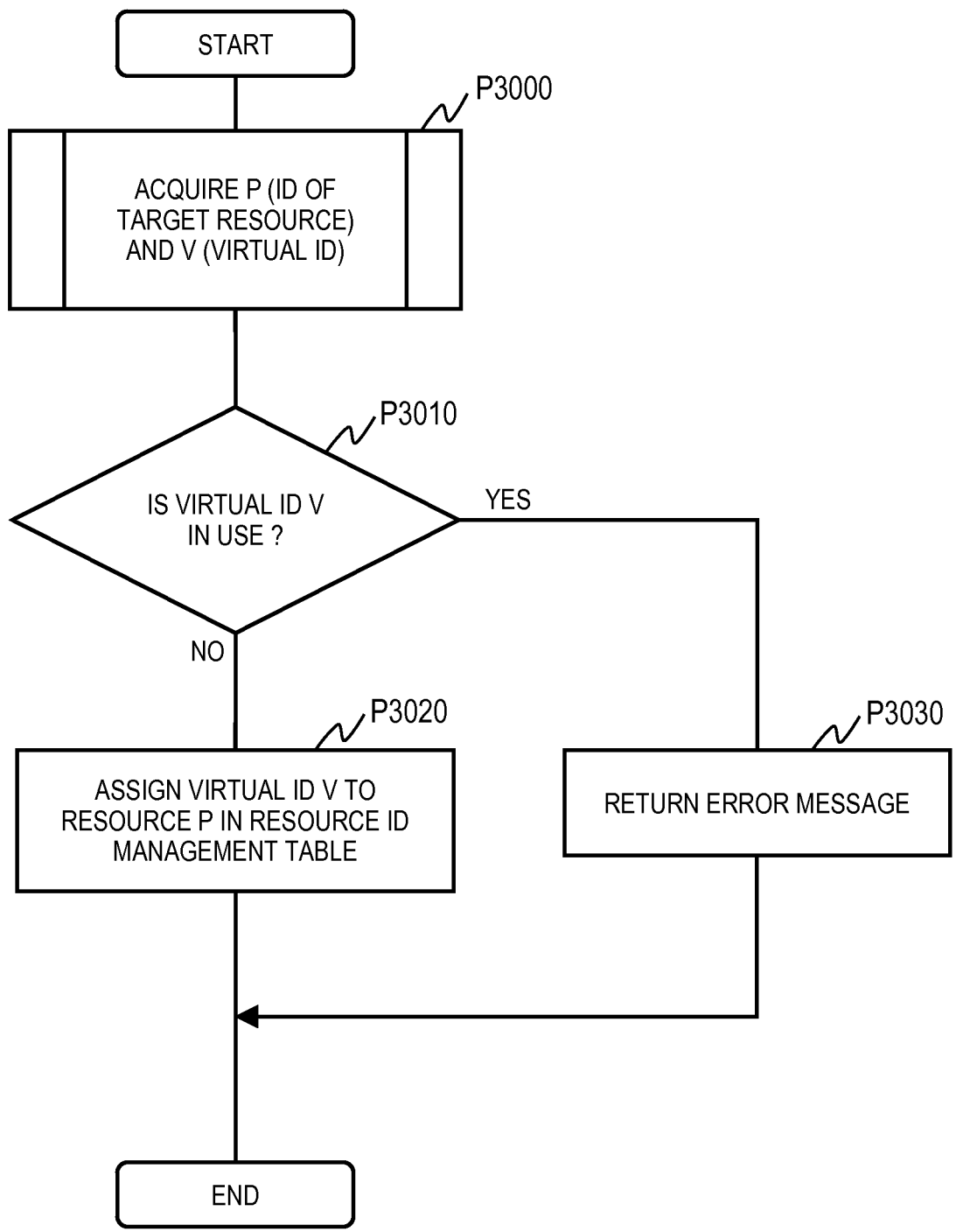
FIG. 14 is a flowchart illustrating assigning a virtual resource ID in Example 1.

FIG. 13 is a flowchart of allocating a resource. Like a virtual storage apparatus creation request, the management server 2600 or a command device 2800 (for example, the command device in the RPU #00) receives a resource allocation request. The access control for this request is the same as that in creating a virtual storage apparatus; the RPU management program 2322 is invoked if the request is from an authorized administrator.

The RPU management program 2322 acquires the real resource identifier of the resource to be transferred and the RPU ID of the destination RPU from the resource allocation request of the administrator (Step P2000). In the following description, the real resource identifier of the resource to be transferred is denoted by S, the RPU ID of the target RPU is denoted by T.

Next, the RPU management program 2322 searches the column 2326A in the resource ID management table 2326 for the designated real resource identifier S to determine whether the column 2326D of the detected entry indicates a virtual resource identifier (Step P2010).

If the resource having the real resource identifier S has already been assigned a virtual resource identifier (YES at Step P2010), the RPU management program 2322 requests the requestor to cancel the virtual resource identifier via the management server 2600 or the storage apparatus control program 2321 (Step P2030) and terminates the allocating a resource. Steps P2010 and P2030 prevent the management by the administrator from being interrupted by the allocating a resource. The administrator can cancel the virtual resource identifier with a control command.

If no virtual resource identifier has been assigned to the resource having the real resource identifier S (NO at Step P2010), the RPU management program 2322 changes the value of the RPU ID (the column 2326C) in the entry including the real resource identifier S into T in the resource ID management table 2326 (Step P2020), and terminates the allocating a resource.

In resource allocation, including a parity group and all volumes associated with the parity group in an RPU can prevent a resource allocated to a different virtual storage apparatus from being used and a resource unallocated to any virtual storage apparatus from being used.

Next, assignment of virtual resource identifiers to real resources is described. The processing described below assigns a virtual resource identifier to a resource that has been transferred to a different RPU by the resource transfer described with reference to FIG. 13.

FIG. 14 is a flowchart of exemplary processing to assign a virtual resource identifier to a real resource in an RPU. Like the virtual storage apparatus creation request, the management server 2600 or a command device 2800 such as the command device in the RPU #00 receives a virtual resource identifier assignment request.

The access control for this request is the same as that in creating a virtual storage apparatus; the RPU management program 2322 is invoked if the request is from an authorized administrator. If a command device has been created in the virtual storage apparatus including the target resource, the command device may receive the virtual resource identifier assignment request.

The RPU management program 2322 acquires the real resource identifier (denoted by P) and a virtual resource identifier (denoted by V) of the resource to which a virtual resource identifier is to be assigned from the virtual resource identifier assignment request of the administrator (Step P3000).

The RPU management program 2322 acquires the RPU ID (the identifier of the RPU including the designated real resource) from the entry including the particular real resource identifier P in the resource ID management table 2326. The RPU management program 2322 checks whether the combination of the acquired RPU ID and the designated virtual resource identifier V is in the resource ID management table 2326 (Step P3010). Specifically, the RPU management program 2322 checks whether the combination matches with the combination of values in the columns 2326C and 2326D of any entry.

If the foregoing combination is in registration (YES at Step P3010), the RPU management program 2322 notifies the requestor that the designated virtual resource identifier exists in the namespace of the designated virtual storage apparatus via the management server 2600 or the storage apparatus control program 2321 (Step P3030) and exists this flow. This approach prevents the same virtual identifier from being duplicated in the virtual storage apparatus.

If the foregoing combination has not been registered (NO at Step P3010), the RPU management program 2322 stores the virtual resource identifier V to the column 2326D of the entry including the real resource identifier P in the resource ID management table 2326 (Step P3020) and terminates the assigning a virtual resource identifier.

Through the above-described creating a virtual storage apparatus, allocating resources, and assigning virtual resource identifiers, the configuration illustrated in FIG. 1 can be established. This embodiment divides the resources of a real storage apparatus into a plurality of groups and provides a host computer and an administrator with the groups as individually-manageable resources of a virtual storage apparatus. This embodiment facilitates the resource management of a virtualized real storage apparatus.

Example 2

Example 1 divides the resources of one real storage apparatus into a plurality of groups and provides the host computer 1000 and the management system 9000 with each group as one virtual storage apparatus. Example 2 configures a plurality of virtual storage apparatuses from a plurality of groups (aggregate RPUs) each provided by a plurality of real storage apparatuses 2000 and provides the virtual storage apparatuses to the host computer 1000 and the management system 9000. Resources for a virtual storage apparatus can be selected from a plurality of real storage apparatuses. In Example 2, the differences from Example 1 are mainly explained.

Figure 15:
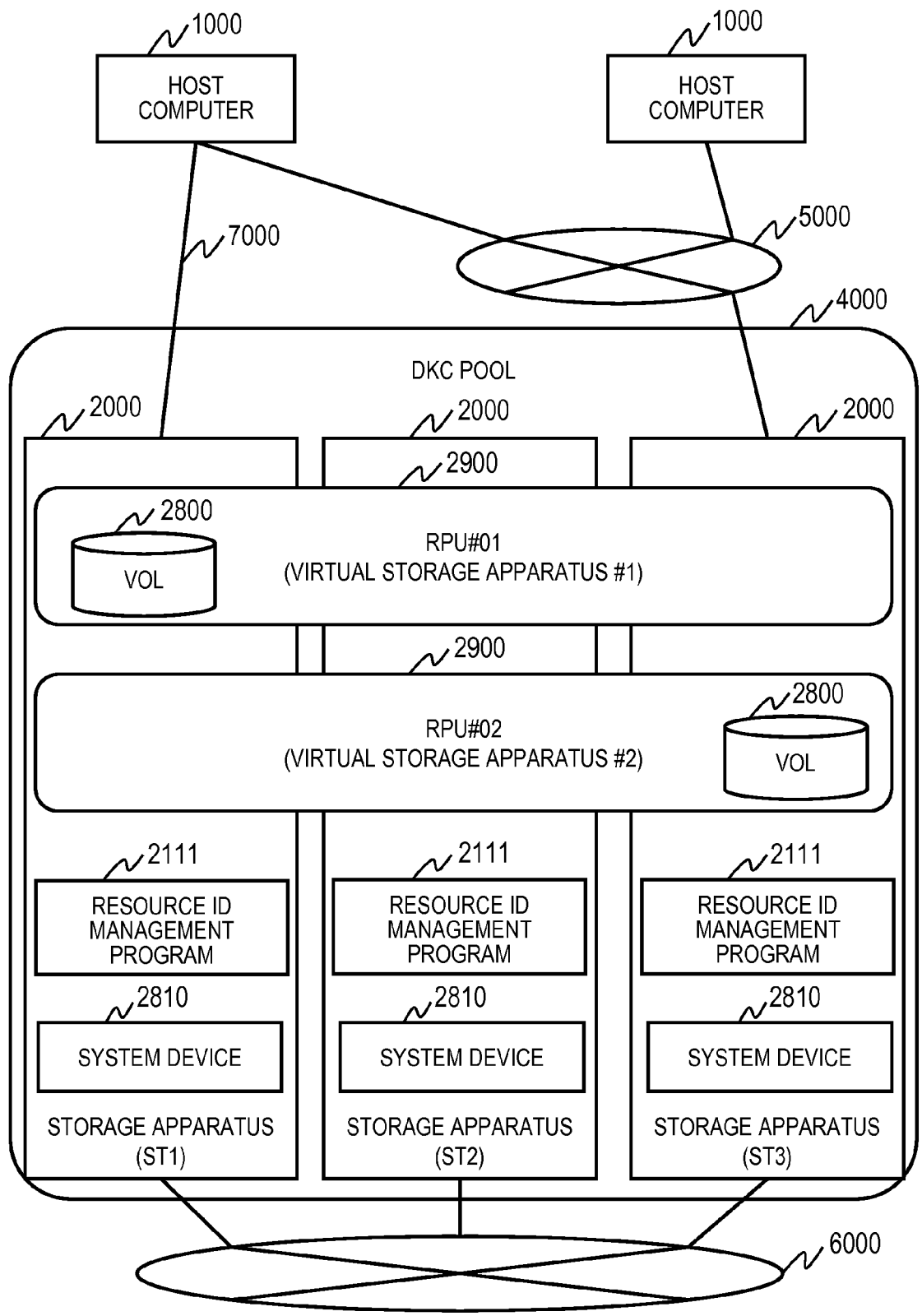
FIG. 15 is a configuration diagram of an overall computer system to illustrate the concept of Example 2.

FIG. 15 is a configuration diagram of an overall computer system to illustrate the concept of Example 2. A plurality of storage apparatuses (real storage apparatuses) 2000 are interconnected with a backend storage network 6000; each storage apparatus 2000 can transfer SCSI commands to the other storage apparatuses 2000 via the backend storage network 6000. The backend storage network 6000 and the storage network 5000 may be the same network.

A system device 2810, which will be described later, is provided in each storage apparatus 2000. For example, the system device is included in the RPU #00 to which all resources belong at the initial state.

In this example, the range allowing transfer of SCSI commands, inclusive of connection of the storage apparatuses, is referred to as a DKC pool 4000. In the DKC pool 4000, there exist resource groups (aggregate RPUs) provided across a plurality of storage apparatuses 2000; each aggregate RPU is recognized by the host computer 1000 and the management client PC 9000 as a virtual storage apparatus.

The configuration of FIG. 15 is achieved by resource groups provided across a plurality of real storage apparatuses 2000, a means for allocating a resource to a resource group, a means for assigning a virtual resource identifier to a resource in a resource group, and a means for transferring a command (SCSI command in this example) transmitted from the host computer 1000 or the management client PC 9000 to a storage apparatus 2000 including the target real resource.

First, an exemplary configuration of resource groups across a plurality of storage apparatuses 2000 is described with reference to FIG. 16. Resources in one storage apparatus 2000 are divided into RPUs 2900 or resource groups, like in the division of resources in Example 1.

In this example, a group across a plurality of storage apparatuses 2000 is an aggregate of RPUs which are included in different storage apparatuses 2000 in the DKC pool 4000 and have the same RPU ID. The RPUs that constitute an aggregate RPU can be uniquely identified in the DKC pool 4000 with the IDs of the storage apparatuses 2000 and the assigned RPU ID.

Figure 16:
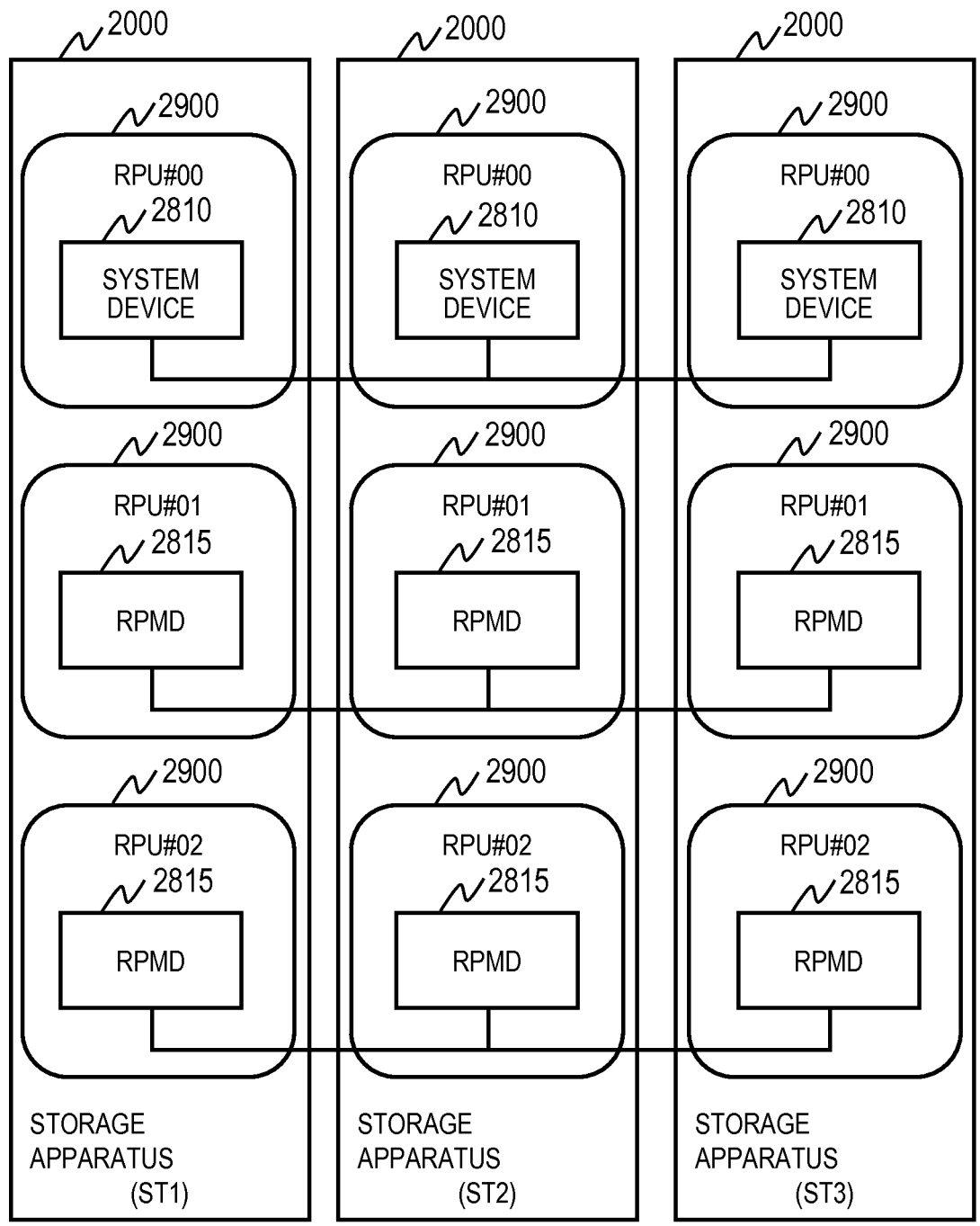
FIG. 16 is a block diagram for illustrating connection of real storage apparatuses in Example 2.

FIG. 16 is a block diagram for illustrating a configuration of the connection among the storage apparatuses. In the example of FIG. 16, three storage apparatuses 2000 constitute the DKC pool 4000. Three resource groups (aggregate RPUs) across the plurality of storage apparatuses 2000, RPU #00, RPU #01, and RPU #02, are shown by way of example. The RPUs that constitute each aggregate RPU have the same RPU ID.

In the aggregate having RPU #00, each RPU (each storage apparatus 2000) includes a system device 2810, which is a volume (LDEV) for receiving commands. In the aggregates having RPU #01 and RPU #02, each RPU (each storage apparatus 2000) includes an RPMD (Resource Partition Management Device) 2815, which is a volume (LDEV) for receiving commands. The system device 2810 and the RPMD 2815 will be described later.

FIG. 17 is a user account table T1000 indicating relationships between user accounts (administrator accounts) and accessible RPUs. Each storage apparatus 2000 has the user account table T1000. The table T1000 is referred to in access control for administrators. The user account table T1000 has a column of user IDs T1010 and a column of allocated RPUs T1020.

In the example of FIG. 17, an administrator managing a virtual storage apparatus can access all the RPUs allocated for the virtual storage apparatus that exist in all the storage apparatuses 2000 in the DKC pool 4000.

For example, it is assumed that an aggregate RPU configured as a virtual storage apparatus 1 (also referred to as VDKC1) is an aggregate of RPUs #01. The administrator VDKC1 ADMIN managing the VDKC1 can access the RPUs #01 existing in all the storage apparatuses 2000 in the DKC pool 4000.

An administrator for handling a storage apparatus 2000 on an independent basis can access only the resources in the one storage apparatus 2000. For example, the administrator ST1 ADMIN can access only the RPU #00 in the real storage apparatus (ST1) 2000 to be operated; the administrator ST2 ADMIN can access only the RPU #00 in the real storage apparatus (ST2) 2000. An administrator who creates a virtual storage apparatus and allocates resources, the administrator DKC POOL ADMIN in the example of FIG. 17, can access all the RPUs in the DKC pool 4000.

FIG. 18 illustrates an exemplary configuration of the DKC pool management table 2329. Each storage apparatus 2000 has the DKC pool management table 2329. The DKC pool management table 2329 manages information on storage apparatuses 2000 that constitute the DKC pool 4000. The DKC pool management table 2329 has a column of real storage apparatus IDs I1000, a column of system device IDs I1010, a column of access port WWNs I1020, and a column of main system devices I1030. The DKC pool management table 2329 is referred to in transferring requests (commands) among the real storage apparatuses 2000.

The real storage apparatus ID column I1000 stores identifiers for uniquely identifying storage apparatuses 2000 in the DKC pool 4000. The system device ID column I1010 stores identifiers for uniquely identifying system devices (volumes) 2810 of the storage apparatuses 2000 in the DKC pool 4000.

The access port WWN column I1020 stores WWNs of the ports to connect to the storage apparatuses 2000 via the network 6000. The main system device column I1030 stores information indicating which system devices are main system devices (system devices having a main attribute). The system device 2810 will be described later.

FIG. 19 is an exemplary configuration of the meta information table 2330. Each storage apparatus 2000 has the meta information table 2330. FIG. 19 shows only part of meta information; the meta information table 2330 includes information on all resources having virtual resource identifiers. The meta information table 2330 is used in transferring requests (commands) among the real storage apparatuses 2000.

The meta information table 2330 manages RPUs and real storage apparatuses to which the resources having virtual resource identifiers belong. The meta information table 2330 has a column of RPU IDs T2000, a column of virtual resource IDs T2001, and a column of real storage apparatus IDs T2002.

The RPU ID column T2000 stores identifiers for identifying RPUs to which resources having virtual resource identifiers belong. The virtual resource ID column T2001 stores virtual resource identifiers for uniquely identifying resources in each aggregate RPU. The real storage apparatus ID column T2002 stores identifiers of storage apparatuses 2000 to which resources having virtual resource identifiers belong.

As will be described later, a resource allocation request in this example designates a resource to be allocated (transferred) by a virtual resource ID. For that purpose, resources in the RPU #00 are assigned virtual resource IDs before being transferred. The virtual resource IDs are assigned to the resources in the RPU #00 by virtual resource ID assignment requests described in Example 1; otherwise, the resources originally have virtual resource IDs at the initial state. As shown in FIG. 19, a defined virtual resource ID does not have to be assigned to any resource.

Figure 20:
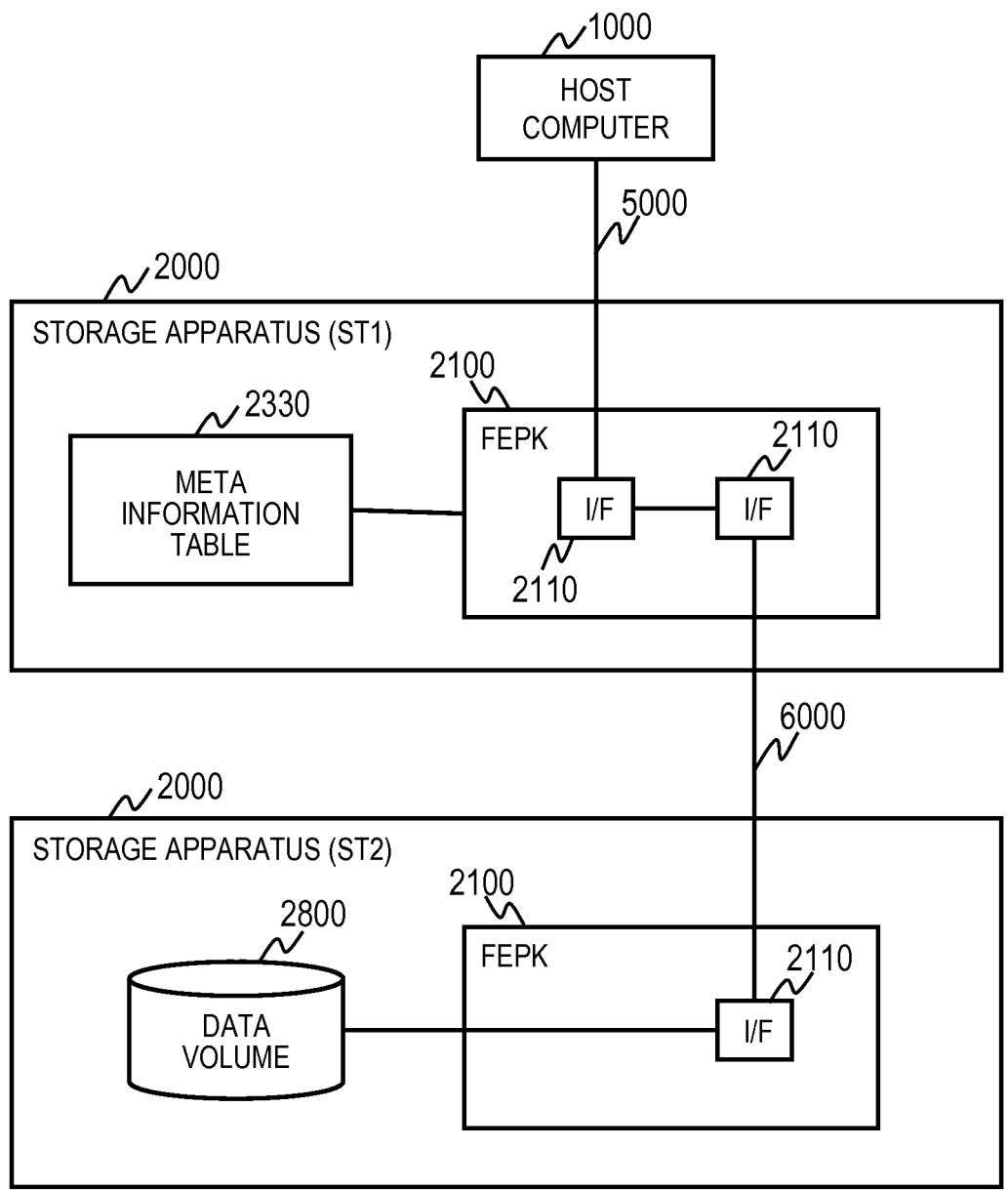
FIG. 20 is a configuration diagram illustrating processing a SCSI command (read request or write request) issued by the host computer in Example 2.

Using FIG. 20, processing a SCSI command (read request or write request) issued by the host computer 1000 in this example is described. As already described in Example 1, the host computer 1000 has logical paths addressed to the WWNs, which have been assigned to the ports of the storage apparatuses 2000, in the network 5000. The host computer 1000 requests read/write of data via the logical path with a SCSI command designating an LU number and an LBA.

The FEPK 2100 (transfer circuit) converts the designated LU number into a corresponding virtual volume identifier (virtual resource identifier of a volume). For example, the control information memory 2320 holds management information associating the real resource identifiers of the ports and the LU numbers with virtual volume identifiers; the FEPK 2100 converts the designated LU number into a virtual volume identifier with reference to this management information. Furthermore, the FEPK 2100 acquires the RPU ID of the RPU including the port that has received the SCSI command from the resource ID management table 2326.

Next, the FEPK 2100 acquires a real identifier of the storage apparatus 2000 including the volume having the foregoing virtual volume identifier from the meta information table 2320. Specifically, the FEPK 2100 identifies an entry including the RPU ID (the column T2000) of the RPU including the port that has received the particular SCSI command and the particular virtual volume identifier (the column T2001) in the meta information table 2330 and selects a real storage apparatus identifier (the column T2002) from the entry.

If the selected real storage apparatus identifier is the identifier of the storage apparatus 2000 including the FEPK 2100, the storage apparatus 2000 processes the SCSI command (read/write request) from the host computer 1000, as described in Example 1.

If the selected identifier of a storage apparatus 2000 is the identifier of a different storage apparatus 2000, the FEPK 2100 selects a target WWN (the column I1030 in the DKC pool management table 2329) to transfer the received SCSI command based on the identifier of the storage apparatus 2000 selected from the DKC pool management table 2329.

The FEPK 2100 transfers the SCSI command sent from the host computer 1000 to the logical path to the backend network 6000 targeted at the WWN together with the identified RPU ID.

The FEPK 2100 of the storage apparatus 2000 that has received the transferred SCSI command processes the received SCSI command (read/write request) based on the received RPU ID and the SCSI command, as described in Example 1. For example, the storage apparatus 2000 that has executed a data read/write returns a response to the received SCSI command to the storage apparatus 2000 that has transferred the command and the storage apparatus 2000 that has received the response transfers it to the host computer 1000.

This configuration enables the FEPKs 2100 to transfer a command among the storage apparatuses 2000; a read/write request received by a storage apparatus 2000 different from the storage apparatus providing a target volume can be appropriately transferred to the storage apparatus 2000 that includes the target volume.

Figure 21:
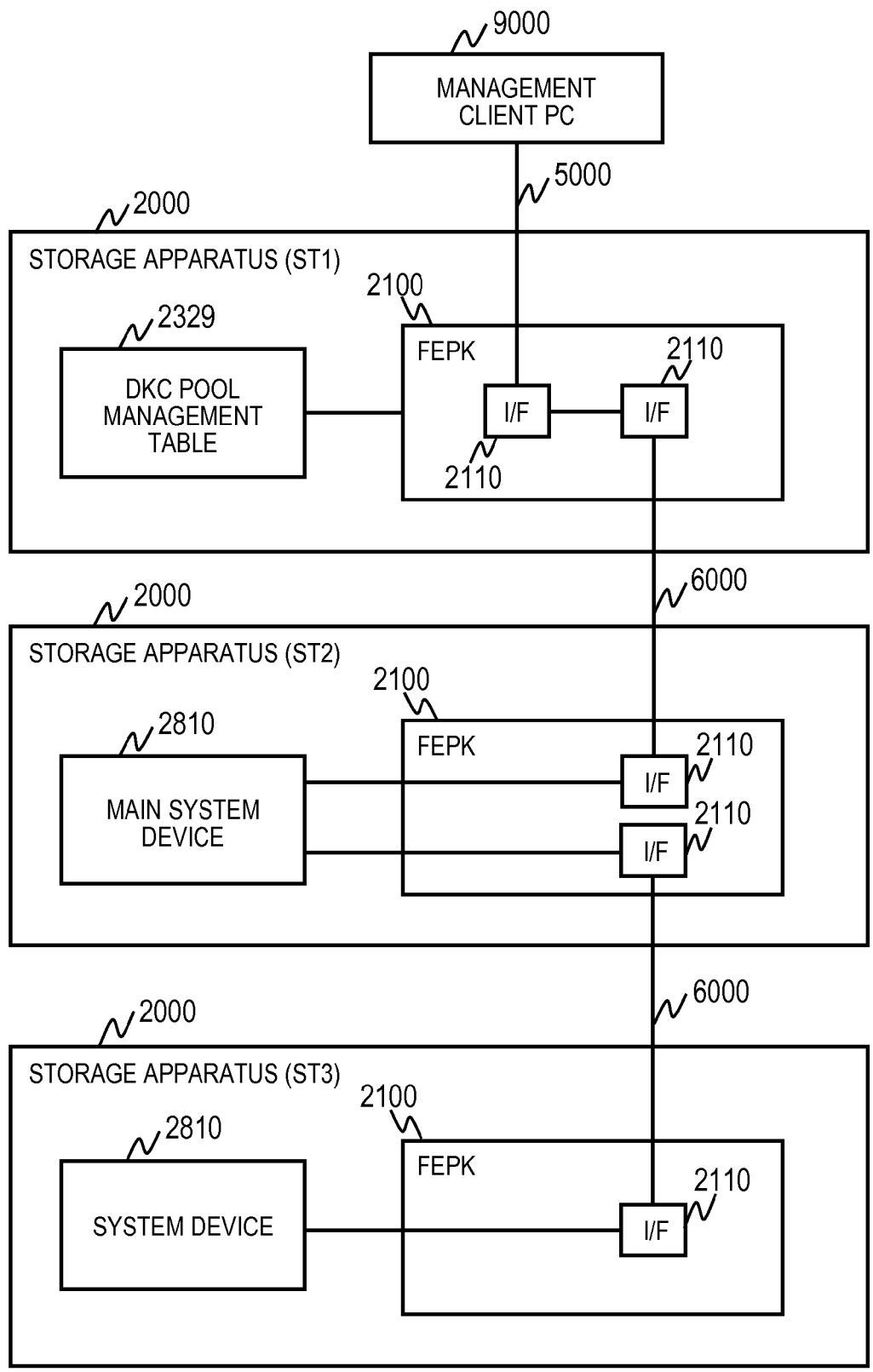
FIG. 21 is a configuration diagram illustrating processing a resource allocation request from the management client PC in Example 2.

Next, with reference to FIG. 21, a flow of processing a request for resource allocation (resource transfer between aggregate RPUs) from the management client PC 9000 is described. In this example, a system device 2810, which is a built-in command device in a storage apparatus 2000, accepts a SCSI command for resource allocation. Upon receipt of a management command including some request, the management server 2600 converts it to a SCSI command and transfers it to the system device 2810.

First, a system device 2810 in some storage apparatus 2000 in the DKC pool 4000 receives an aforementioned request from the management client PC 9000. The storage apparatus control program 2321 (the relevant MPPK 2220) refers to the main system device column I1030 in the DKC pool management table 2329 to select an entry holding "1" in the column I1030.

The storage apparatus control program 2321 acquires a real storage apparatus identifier (real identifier of the storage apparatus 2000) and the system device identifier from the selected entry. If the acquired real storage apparatus identifier is the identifier of a real storage apparatus 2000 different from the real storage apparatus 2000 that has received the particular request, the storage apparatus control program 2321 uses the FEPK 2100 to transfer the received command to the system device 2810 having a main attribute in the different real storage apparatus 2000 via the backend storage network 6000.

When the main system device 2810 receives the transferred SCSI command, the storage apparatus control program 2321 (the relevant MPPK 2220) in the storage apparatus that has received the command acquires the identifier, namely the virtual resource identifier, of the target resource and acquires the identifier of the real storage apparatus 2000 including the real resource indicated by the acquired virtual resource identifier.

If the acquired identifier of a storage apparatus 2000 is the identifier of the storage apparatus 2000 including the main system device 2810, the storage apparatus 2000 performs the resource allocation described in Example 1. Since the resource to be allocated has already been assigned a virtual resource ID, the virtual resource ID is canceled.

If the acquired identifier of a storage apparatus 2000 is the identifier of a storage apparatus 2000 different from the storage apparatus 2000 including the main system device 2810, the storage apparatus control program 2321 acquires the WWN to be addressed and the system device identifier of the different real storage apparatus 2000 from the DKC pool management table 2329 and transfers the SCSI command via the backend storage network 6000 using the FEPK 2100.

The system device 2810 having a main attribute in the different storage apparatus 2000 receives the SCSI command from the port connected to the backend storage network 6000. The different storage 2000 performs the resource allocation described in Example 1.

A request for assignment of a virtual resource identifier to the transferred resource is included in a SCSI command and accepted by the system device 2810 like the request for resource allocation. Transferring the SCSI command is the same as that in the resource allocation.

A request for creation of a virtual storage apparatus from the management client PC 9000 is also included in a SCSI command and accepted by the system device 2810 like the request for resource allocation. The main system device 2810 issues requests for creation of a virtual storage apparatus to the system devices 2810 of all the real storage apparatuses 2000 in the DKC pool 4000 via the backend storage network 6000. The real storage apparatuses 2000 create a virtual storage apparatus.

When the meta information table 2330 is in need of update, all the real storage apparatuses 2000 updates their meta information tables 2330 (synchronizes their meta information tables 2330).

For example, to update the meta information tables 2330 because of a command accepted by a system device 2810, the resource ID management program 2323 in the storage apparatus 2000 including the main system device 2810 notifies the other storage apparatuses 2000 of the update of the meta information tables 2330 via the backend storage network 6000. The main system device can integrally manage resource transfers among aggregate RPUs and the physical resources (parity groups and ports) of all the real storage apparatuses 2000.

Figure 22:
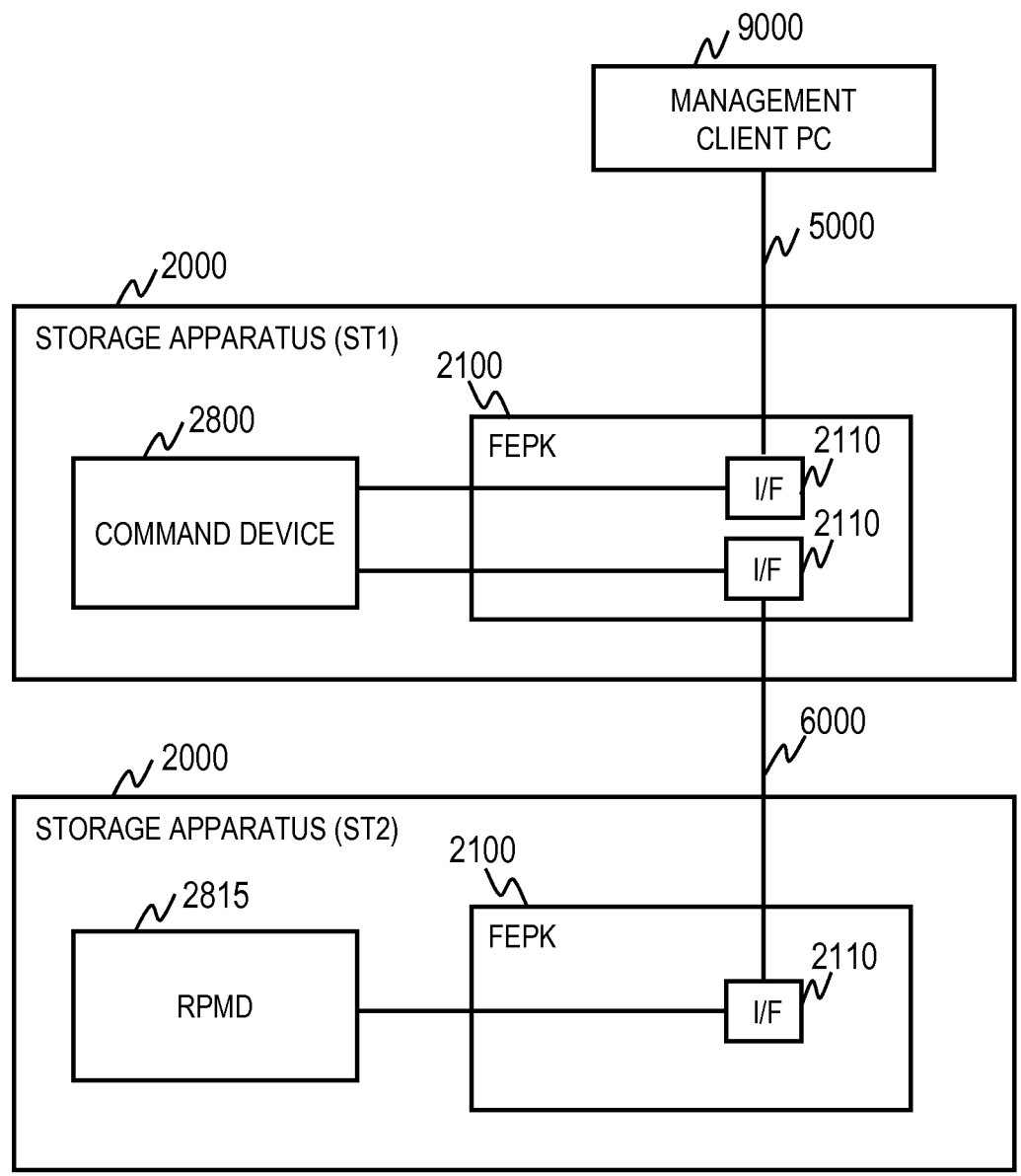
FIG. 22 is a configuration diagram illustrating processing a resource management request from the management client PC in Example 2.

FIG. 22 is a configuration diagram illustrating a flow of processing a request for resource management from the management client PC 9000. The request for resource management in the following description is a request for processing closed in a virtual storage apparatus (aggregate RPU). Examples of the resource management are formatting a volume, changing port attributes (between target and initiator), and the like.

The management client PC 9000 sends a resource management request (SCSI command) to some command device described in Example 1. The storage apparatus control program 2321 (relevant MPPK 2220) acquires the virtual resource identifier of the target resource which is designated by the request and selects the identifier of the real storage apparatus 2000 including the target resource from the meta information table 2330.

If the real storage apparatus 2000 having the selected identifier is the storage apparatus running the storage apparatus control program 2321, the program 2321 converts the virtual resource identifier of the target resource into a real resource identifier with reference to the resource ID management table 2323 and processes the request with the real resource identifier.

If the real storage apparatus 2000 having the selected identifier is a different storage apparatus, the storage apparatus control program 2321 transfers the received resource management request (SCSI command) to the RPMD 2815 which is a volume for accepting control commands among the real storage apparatuses. The RPMD 2815 is provided independently from the command devices for receiving commands from an external apparatus (the management client PC 9000) to eliminate user resources (the command devices) from being affected.

The FEPK 2100 transfers the resource management request via the backend storage network 6000. The storage apparatus control program 2321 at the addressee converts the virtual resource identifier of the target resource of the received request into a real resource identifier and processes the request with the real resource identifier.

A request for creation of a volume can also be made by a resource management request. For example, if a parity group is designated with a virtual resource ID, the storage apparatus control program 2321 refers to the meta information table 2330 to transfer the request to the real storage apparatus 2000 including the parity group.

A newly created volume is assigned a virtual resource identifier. Accordingly, in addition to the resource ID management table 2326 in the real storage apparatus that creates the volume, the meta information table 2330 is updated. For example, the storage apparatus control program 2321 in the real storage apparatus 2000 that has created a volume notifies the other real storage apparatuses 2000 of the update of the meta information table 2330 via the backend storage network 6000.

Figure 23A:
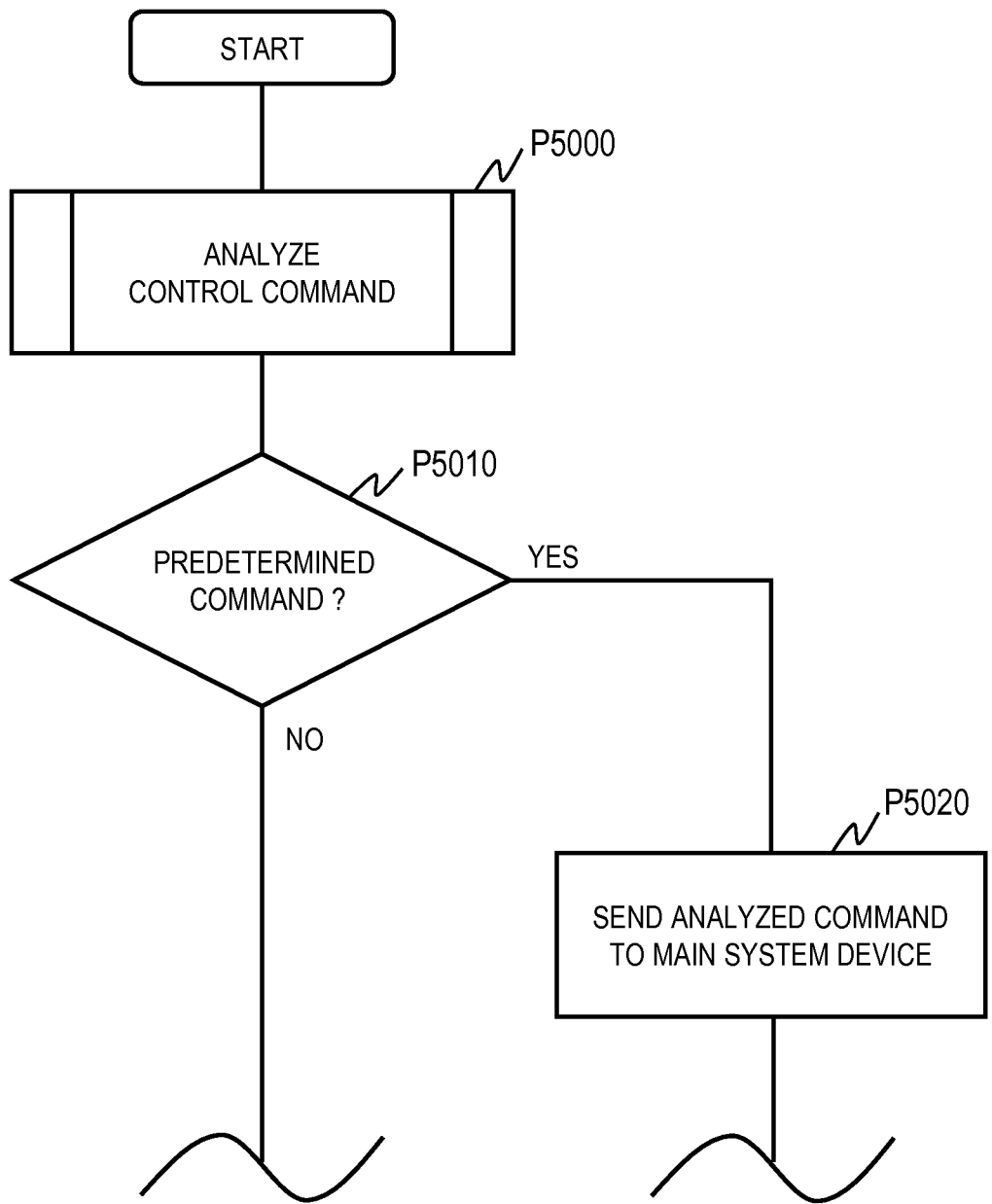
FIG. 23A is a flowchart illustrating assigning a command in Example 2.
Figure 23B:
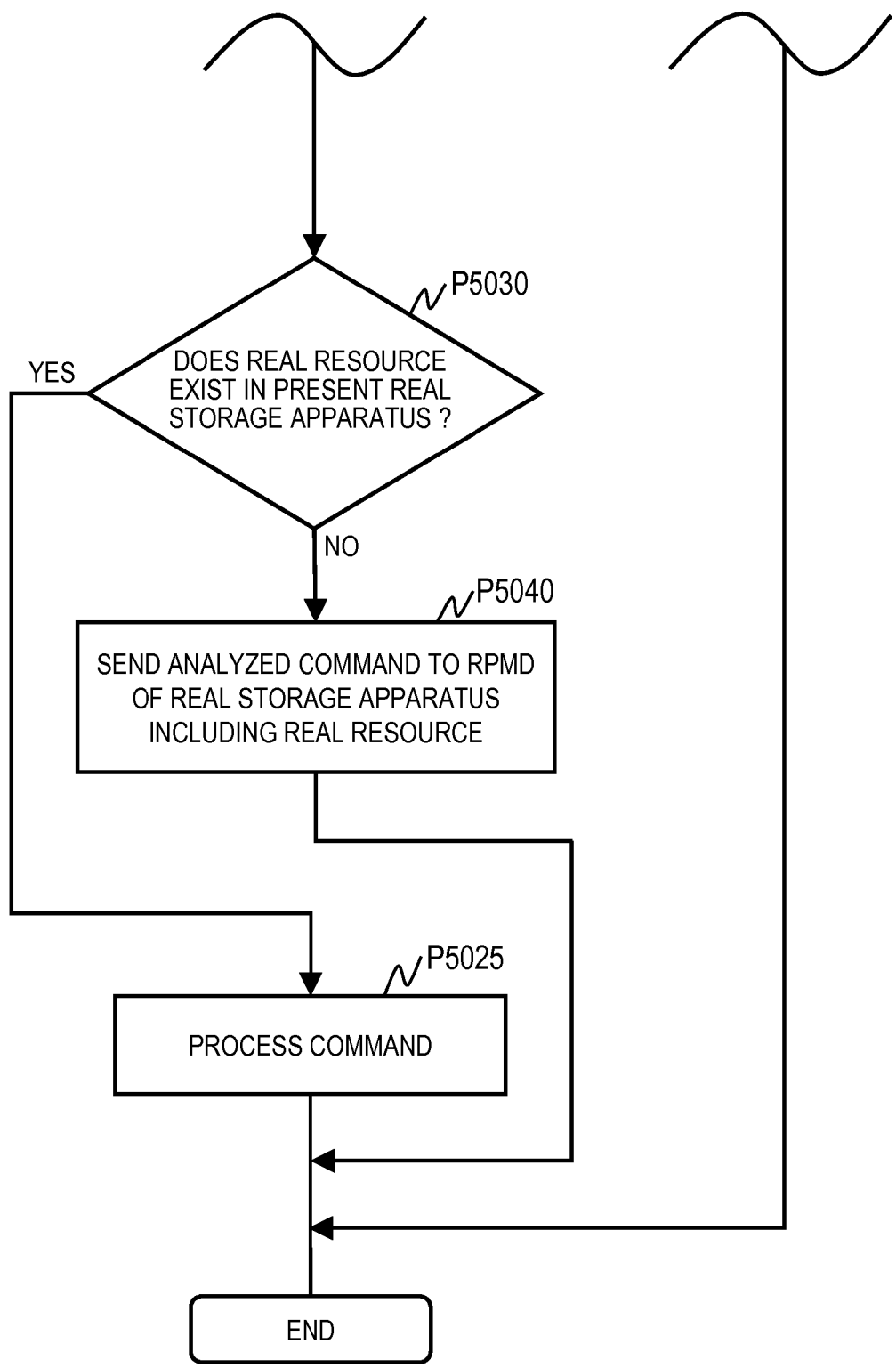
FIG. 23B is a flowchart illustrating assigning a command in Example 2.

FIGS. 23A and 23B are flowcharts illustrating the transferring a storage management operation request (SCSI command) from the management client PC 9000, which has been described with reference to FIGS. 21 and 22.

A real storage apparatus 2000 that has received a storage management operation request (SCSI command) acquires a designated operation from the management operation request and analyzes the operation (Step P5000).

The real storage apparatus 2000 determines whether the designated operation is a predetermined kind of operation, which is an operation involving resource transfer among aggregate RPUs (creation of a virtual storage apparatus, resource allocation, or assignment of a virtual resource identifier) in the above-described example (Step P5010).

If a result of the determination at Step P5010 is positive, the real storage apparatus 2000 sends the request to the main system device 2810 (Step P5020). Thereafter, the processing described with reference to FIG. 21 is performed.

If a result of the determination at Step P5010 is negative, the real storage apparatus 2000 performs the processing described with reference to FIG. 22. That is to say, if the resource having the virtual resource identifier of the request target is in the storage apparatus 2000 that has received the request (YES at Step P5030), the real storage apparatus 2000 processes the request (Step P5025). If the resource having the virtual resource identifier of the request target is in a different storage apparatus 2000 (NO at Step P5030), the real storage apparatus 2000 transfers the request to the RPMD 2815 in the real storage apparatus 2000 including the particular resource.

For commands requesting processing closed in an aggregate RPU and commands involving different aggregate RPUs, different receiving devices and different transfer methods are used, so that transfer control suitable for each of them can be performed.

The network 6000 connecting storage apparatuses 2000 is shared by transferring SCSI commands issued by the host computer 1000 to other storage apparatuses 2000 described with reference to FIG. 20 and transferring storage management operation requests. If the transfer of a storage management operation request occurs frequently, the use of the network 6000 might interfere with processing of I/O requests from the host computer 1000 to cause delay in the processing of I/O requests from the host computer 1000.

The foregoing example implements determination where to transfer a command in the storage apparatus 2000 that receives the command; consequently, unnecessary command transfers among the storage apparatuses 2000 such as broadcast of the command to all the storage apparatuses 2000 in the DKC pool 4000 can be eliminated; consequently, minimum delay is achieved in processing I/O requests from the host computer 1000.

Furthermore, the storage apparatus 2000 at a command destination converts a virtual resource identifier designated by the command to a real resource identifier; this approach minimizes increase in the amount of transferred information caused by the change of the contents of the command in transferring the command among storage apparatuses 2000. The amount of information transferred in the network 6000 is substantially the same as the amount of information transmitted in the network 5000.

The meta information tables 2330 (information on resource configuration in the overall system) should be synchronized among all the real storage apparatuses 2000. The time taken by the information synchronization varies depending on the number of storage apparatuses 2000 in the DKC pool 4000 and the bandwidth of the network 6000 among the storage apparatuses 2000. For example, the storage apparatus control program 2321 may determine whether to expedite the synchronization of the configuration information depending on the details of update and determine when to update the information so as to prevent the command processing speed from being lowered.

As described above, the RPU management and the resource identifier management explained in Example 1 and the synchronization of configuration information among real storage apparatuses and the command transfer among real storage apparatuses specifically explained in this example achieve the configuration shown in FIG. 15, so that a plurality of virtual storage apparatuses provided across the plurality of real storage apparatuses 2000 can be appropriately managed and controlled.

In the above-described example, the storage apparatus 2000 determines where to transfer a command. Unlike this example, an external management computer connected to the storage system (the plurality of storage apparatuses 2000) via a network may determine where to transfer a command and transfer the command. For example, the management computer has the DKC pool management table 2329 and the meta information table 2330 explained in Example 2.

Like the above-described storage apparatus 2000, the management computer that has received a command from the management client PC 9000 refers to the virtual identifier in the received command and the information owned by itself to select a storage apparatus 2000 for the command destination and transfers the command to the storage apparatus 2000 via the network 2000.

As set forth above, embodiments of this invention have been described; however, this invention is not limited to the foregoing embodiments. A part of the configuration of one example can be replaced with that of another example, or a part of the configuration of one example can be added to the configuration of another example. Each element in the examples can be easily deleted, changed, or added within the scope of this invention.

For example, in the above-described two examples, one or more identical RPU IDs are associated with one virtual storage apparatus; however, a plurality of RPUs having different RPU IDs may be allocated to a virtual storage apparatus.

This invention may be implemented with software running on a processor or implemented with dedicated hardware or a combination of a processor operating in accordance with software and dedicated hardware. The programs may be installed in the apparatuses through a program distribution server or a non-transitory storage medium. In this invention, the data structure that expresses information is not limited; the information may be expressed in data structures such as a table, a list, a database, a queue, and other ones.

The foregoing descriptions on the processing have been provided with subjects (agents) of programs; however, they may have subjects of a processor or an apparatus (system) including a processor because the processor executes the programs using memories and communication I/Fs to perform predetermined processing.

A processor operates in accordance with a program to work as a functional part for implementing a predetermined function. For example, the processor operates in accordance with a control program to function as a controller and operates in accordance with a management program to function as a management part. An apparatus or a system including the processor is an apparatus or a system including these functional parts.

The information of programs, tables, and files to implement the functions can be stored in a storage device such as a non-volatile semiconductor memory, a hard disk drive, or an SSD (Solid State Drive), or a computer-readable non-transitory data storage medium such as an IC card, an SD card, or a DVD.

The invention claimed is:

1. A storage system comprising a first real storage apparatus including a plurality of real resources, the real resources including: (i) physical resources comprising one or more ports and one or more parity groups; and (ii) logical resources including one or more volumes comprising a storage area provided by the one or more parity groups, the first real storage apparatus including:

a plurality of virtual storage apparatuses, each virtual storage apparatus being assigned an independently defined namespace;

a plurality of real resource groups comprising allocation resource groups each allocated to one of the plurality of virtual storage apparatuses;

first management information comprising:
real resource group identifiers each identifying one of the plurality of real resource groups;
virtual resource identifiers individually assigned to the real resources in a namespace for one of the virtual storage apparatuses,
real resource identifiers individually assigned to the real resources in a namespace defined for the first real storage apparatus, the virtual resource identifiers being associated with the real resource identifiers, and the real resource identifiers comprising: (i) physical resource identifiers identifying each of the one or more ports and each of the one or more parity groups and (ii) logical resource identifiers identifying each of the one or more volumes;
user identifiers each identifying one of a plurality of users; and
permission level identifiers each identifying one of a plurality of operation permission levels assigned to each of the user identifiers, the operation permission levels including a first permission level that permits operation of the one or more volumes of one of the real resource groups identified by a corresponding real resource group identifier and prohibits operation of the physical resources of the one real resource group identified by the corresponding real resource group identifier; and a controller for:
receiving a command including a designation with virtual resource identifiers,
converting the virtual resource identifiers in the command into real resource identifiers with reference to the first management information,
processing the command with the converted real resource identifiers,
acquiring a command requesting, by a user identified by a corresponding user identifier, transfer of a designated physical real resource identified by a first physical real resource identifier from a first real resource group identified by a first real resource group identifier to a second real resource group identified by a second real resource group identifier,
determining whether the requesting user in the command has been assigned the first permission level with reference to the first management information, and
rejecting the transfer of the designated real resource if the requesting user in the command has been assigned the first permission level.

2. The storage system according to claim 1, wherein:
the first real storage apparatus further includes second management information for associating the real resource groups allocated to the plurality of virtual storage apparatuses with virtual storage apparatus identifiers which are unique to the storage system, and
in response to an inquiry about a configuration of a first virtual storage apparatus of the plurality of virtual storage apparatuses, the controller returns a virtual identifier selected from a virtual storage apparatus identifier and virtual resource identifiers of the first virtual storage apparatus.

3. The storage system according to claim 1, wherein the controller:
  receives a command for a first virtual storage apparatus of the plurality of virtual storage apparatuses,
  determines whether a target real resource designated by a virtual resource identifier in the command is a real resource in the first virtual storage apparatus with reference to the first management information, and
  rejects a request of the command if the target real resource is included in a virtual storage apparatus different from the first virtual storage apparatus.

4. The storage system according to claim 1, wherein the controller:
  acquires a command requesting assignment of the designated virtual resource identifier to a first real resource allocated to a first virtual storage apparatus of the plurality of virtual storage apparatuses,
  determines whether the designated virtual resource identifier exists in a namespace for the first virtual storage apparatus with reference to the first management information, and
  rejects the assignment of the designated virtual resource identifier to the first real resource if the designated virtual resource identifier already exists in the namespace for the first virtual storage apparatus.

5. The storage system according to claim 1, further comprising:
  a second real storage apparatus,
  wherein:
    a first virtual storage apparatus of the plurality of virtual storage apparatuses is allocated a real resource group in the second real storage apparatus,
    the first real storage apparatus and the second real storage apparatus each include third management information for individually associating real resources allocated to the first virtual storage apparatus with real storage apparatuses including the real resources, and
    each of the first real storage apparatus and the second real storage apparatus individually refers to the third management information to identify a real storage apparatus including a target real resource of a first command, and if the target real resource is included in the other real storage apparatus, sends the command including a request and a designation of the target real resource of the first command to the other real storage apparatus.

6. The storage system according to claim 5, wherein each of the first real storage apparatus and the second real storage apparatus notifies the other real storage apparatus of an update of the third management information and synchronizes the third management information.

7. The storage system according to claim 5, wherein:
  the third management information associates virtual resource identifiers with real storage apparatuses,
  the first command designates the target real resource by a virtual resource identifier, and
  each of the first real storage apparatus and the second real storage apparatus sends the command including the request and the virtual resource identifier of the target real resource of the first command to the other real storage apparatus if the target resource is included in the other storage apparatus.

8. The storage system according to claim 5, wherein each of the first real storage apparatus and the second real storage apparatus has a volume for accepting commands sent between the first real storage apparatus and the second real storage apparatus, independently from a volume for accepting commands from an external apparatus.

9. A control method for a storage system including a first real storage apparatus including a plurality of real resources, the real resources including: (i) physical resources comprising one or more ports and one or more parity groups; and (ii) logical resources including one or more volumes comprising a storage area provided by the one or more parity groups, the control method comprising:
  allocating, from a plurality of real resource groups, each of plurality of allocation real resource groups to one of a plurality of virtual storage apparatuses, each virtual storage apparatus being assigned an independently defined namespace;
  using first management information comprising:
    real resource group identifiers each identifying one of the plurality of real resource groups;
    virtual resource identifiers individually assigned to the real resources in a namespace for one of the virtual storage apparatuses;
    real resource identifiers individually assigned to the real resources in a namespace defined for the first real storage apparatus, the virtual resource identifiers being associated with the real resource identifiers, and the real resource identifiers comprising: (i) physical resource identifiers identifying each of the one or more ports and each of the one or more parity groups and (ii) logical resource identifiers identifying each of the one or more volumes;
    user identifiers each identifying one of a plurality of users; and
    permission level identifiers each identifying one of a plurality of operation permission levels assigned to each of the user identifiers, the operation permission levels including a first permission level that permits operation of the one or more volumes of one of the real resource groups identified by a corresponding real resource group identifier and prohibits operation of the physical resources of the one real resource group identified by the corresponding real resource group identifier;
  receiving a command including a designation with virtual resource identifiers;
  converting the virtual resource identifiers in the command into real resource identifiers with reference to the first management information;
  processing the command with the converted real resource identifiers;
  acquiring a command requesting, by a user identified by a corresponding user identifier, transfer of a designated physical real resource identified by a first physical real resource identifier from a first real resource group identified by a first real resource group identifier to a second real resource group identified by a second real resource group identifier;
  determining whether the requesting user in the command has been assigned the first permission level with reference to the first management information; and
  rejecting the transfer of the designated real resource if the requesting user in the command has been assigned the first permission level.

10. The control method for a storage system according to claim 9, further comprising:
  creating second management information for associating the real resource groups allocated to the plurality of virtual storage apparatuses with virtual storage apparatus identifiers which are unique to the storage system; and returning, in response to an inquiry about a configuration of a first virtual storage apparatus of the plurality of virtual storage apparatuses, a virtual identifier selected from a virtual storage apparatus identifier for the first virtual storage apparatus and virtual resource identifiers.

11. The control method for a storage system according to claim 9, wherein a first virtual storage apparatus of the plurality of virtual storage apparatuses has been allocated real resource groups provided by a plurality of real storage apparatuses, wherein the control method further comprises:

creating third management information for individually associating real resources allocated to the first virtual storage apparatus with real storage apparatuses including the real resources;

identifying a real storage apparatus including a target resource of a first command which is received by one real storage apparatus of the plurality of real storage apparatuses with reference to the third management information; and sending, in a case where the target resource is included in a real storage apparatus different from the one real storage apparatus, the command including a request and a designation of the target resource of the first command to the different real storage apparatus.

12. The control method for a storage system according to claim 11, further comprising:

notifying, by the plurality of real storage apparatuses, one another of an update of the third management information to synchronize the third management information.

* * * * *